United States Patent
Igarashi et al.

(10) Patent No.: US 10,903,700 B2
(45) Date of Patent: Jan. 26, 2021

(54) DUST CORE, STATOR CORE, AND STATOR

(71) Applicants: Sumitomo Electric Sintered Alloy, Ltd., Takahashi (JP); Sumitomo Electric Industries, Ltd., Osaka (JP)

(72) Inventors: Naoto Igarashi, Itami (JP); Shinichi Hirono, Itami (JP); Tomoyuki Ueno, Itami (JP); Asako Watanabe, Itami (JP)

(73) Assignees: SUMITOMO ELECTRIC SINTERED ALLOY, LTD., Takahashi (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 14 days.

(21) Appl. No.: 16/311,771

(22) PCT Filed: Apr. 6, 2017

(86) PCT No.: PCT/JP2017/014350
§ 371 (c)(1),
(2) Date: Dec. 20, 2018

(87) PCT Pub. No.: WO2017/221512
PCT Pub. Date: Dec. 28, 2017

(65) Prior Publication Data
US 2019/0214860 A1    Jul. 11, 2019

(30) Foreign Application Priority Data
Jun. 24, 2016 (JP) ................... 2016-125187

(51) Int. Cl.
*H02K 1/16*    (2006.01)
*H02K 1/02*    (2006.01)
(Continued)

(52) U.S. Cl.
CPC ............... *H02K 1/165* (2013.01); *H01F 3/08* (2013.01); *H02K 1/02* (2013.01); *H02K 1/14* (2013.01); *H02K 1/182* (2013.01)

(58) Field of Classification Search
CPC ............... H02K 1/02; H02K 3/38; H02K 7/08
(Continued)

(56) References Cited

U.S. PATENT DOCUMENTS

2005/0073213 A1*  4/2005  Naito .................. H02K 1/148
                                          310/154.05
2010/0187934 A1*  7/2010  Asano .................. F04C 15/008
                                          310/156.32
(Continued)

FOREIGN PATENT DOCUMENTS

CN    1285154 C      11/2006
JP    11098724 A  *   4/1999
(Continued)

OTHER PUBLICATIONS

Machine Translation JP11098724 (Year: 1999).*
Machine Translation JP2009290128 (Year: 2009).*

*Primary Examiner* — Jose A Gonzalez Quinones
(74) *Attorney, Agent, or Firm* — Xsensus LLP

(57) ABSTRACT

A dust core included in an axial-gap rotary electric machine. The dust core includes a sector-shaped plate-like yoke portion, and a tooth portion integrated with the yoke portion and projecting from the yoke portion. Denoting one of surfaces of the yoke portion from which the tooth portion projects as a toothed surface, the toothed surface has a concave portion provided between a peripheral edge of the tooth portion and a peripheral edge of the yoke portion.

17 Claims, 26 Drawing Sheets

(51) Int. Cl.
*H02K 1/14* (2006.01)
*H01F 3/08* (2006.01)
*H02K 1/18* (2006.01)

(58) Field of Classification Search
USPC .............. 310/44, 49.11, 49.05, 49.22, 254.1
See application file for complete search history.

(56) References Cited

U.S. PATENT DOCUMENTS

| | | | |
|---|---|---|---|
| 2010/0225195 A1* | 9/2010 | Asano | H02K 21/24 310/216.067 |
| 2011/0084569 A1* | 4/2011 | Asano | H02K 1/148 310/216.058 |
| 2011/0316381 A1* | 12/2011 | Asano | H02K 1/148 310/216.045 |
| 2015/0048696 A1 | 2/2015 | Kobler et al. | |

FOREIGN PATENT DOCUMENTS

| | | | |
|---|---|---|---|
| JP | 2008-086115 A | | 4/2008 |
| JP | 2008-193838 A | | 8/2008 |
| JP | 2009290128 A | * | 12/2009 |
| JP | 2010-11669 A | | 1/2010 |
| JP | 2010011669 A | * | 1/2010 |
| JP | 2016116270 A | * | 6/2016 |

* cited by examiner

53 : 54, 55

US 10,903,700 B2

DUST CORE, STATOR CORE, AND STATOR

TECHNICAL FIELD

The present invention relates to a dust core, a stator core, and a stator.

This application claims the priority of Japanese Patent Application No. 2016-125187, filed Jun. 24, 2016, the entirety of which is incorporated herein by reference.

BACKGROUND ART

Stator cores included in axial-gap motors are disclosed by PTL 1 and 2.

CITATION LIST

Patent Literature

PTL 1: Japanese Unexamined Patent Application Publication No. 2008-86115

PTL 1: Japanese Unexamined Patent Application Publication No. 2008-193838

SUMMARY OF INVENTION

A dust core according to the present disclosure is a dust core included in an axial-gap rotary electric machine, the dust core comprising:

a sector-shaped plate-like yoke portion; and a tooth portion integrated with the yoke portion and projecting from the yoke portion, wherein, denoting one of surfaces of the yoke portion from which the tooth portion projects as a toothed surface, the toothed surface has a concave portion provided between a peripheral edge of the tooth portion and a peripheral edge of the yoke portion.

A stator core according to the present disclosure is a stator core included in an axial-gap rotary electric machine, the stator core comprising:

the above dust core according to the present disclosure, wherein a plurality of dust cores are combined together annularly.

A stator according to the present disclosure is a stator included in an axial-gap rotary electric machine, the stator comprising:

the above stator core according to the present disclosure; and coils provided on the tooth portions of the dust cores forming the stator core.

DESCRIPTION OF EMBODIMENTS

An axial-gap rotary electric machine (an electric motor or a generator) in which a rotor and a stator are provided facing each other in an axial direction is known. In general, a stator included in an axial-gap rotary electric machine includes a stator core including an annular yoke portion and a plurality of tooth portions projecting from the yoke portion in the axial direction, and coils provided around the respective tooth portions.

In recent years, some proposals have been made in which a stator core is formed of a dust core obtained by compacting soft magnetic powder into an integral member including a yoke portion and tooth portions.

Problems to be Solved

To improve magnetic characteristics of a dust core, the density of the dust core needs to be increased.

To increase the density of the dust core, soft magnetic powder needs to be compacted with a high compacting pressure (surface pressure). However, to form the entirety of the stator core from a dust core, since the stator core has a large size, a great compacting load is required for the compacting, which imposes restrictions on associated apparatuses.

Accordingly, the stator core may be divided in the circumferential direction into core pieces each formed of as a dust core, and the core pieces may be combined into an annular stator core. However, if the compacting pressure is increased to increase the density of the dust core, there is a problem in that the mold tends to be damaged easily. Hence, there is a demand for improvement in the productivity of dust cores to be included in an axial-gap rotary electric machine, more specifically, dust cores serving as core pieces that form a stator core, by suppressing the occurrence of damage to the mold while increasing the compacting pressure and thus increasing the density of each of the dust cores.

It is an object of the present disclosure to provide a dust core that can have a high density and can be manufactured with high productivity. It is another object of the present disclosure to provide a stator core including the dust core. It is yet another object of the present disclosure to provide a stator including the stator core.

The present inventors have thoroughly examined the cause of damage to the mold that may occur in the process of forming a dust core obtained as an integral member including a sector-shaped plate-like yoke portion and tooth portions projecting from the yoke portion. Consequently, the present inventors have found the following.

Figure 28:
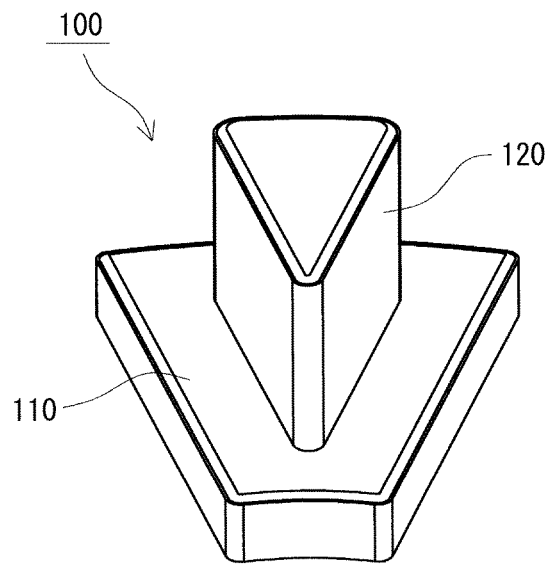
FIG. 28 is a perspective view of a prior-art dust core.
Figure 29:
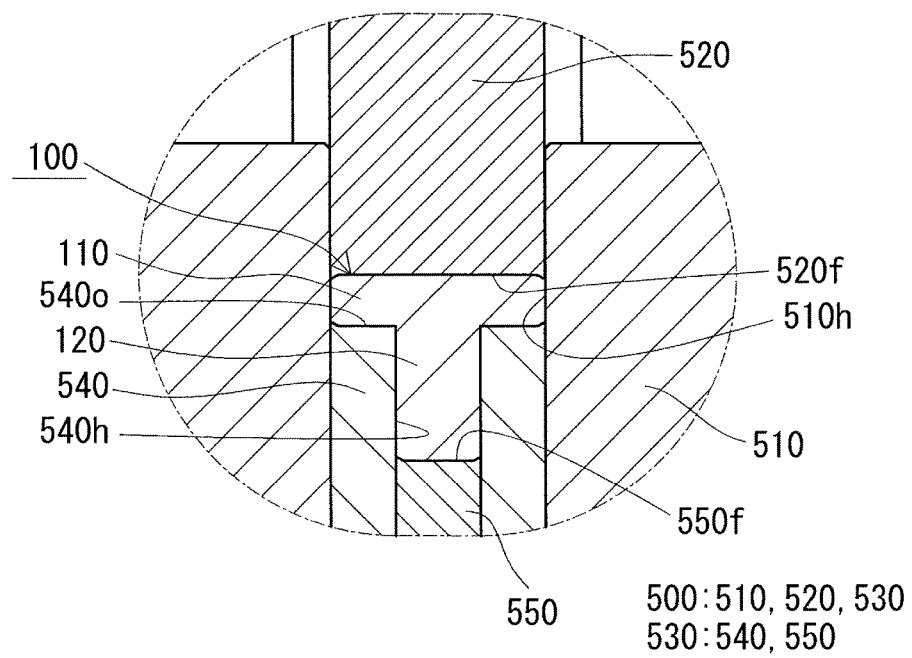
FIG. 29 is an enlarged vertical sectional view illustrating a configuration of relevant part of a mold for forming the prior-art dust core illustrated in FIG. 28.

The present inventors have examined a case of forming a dust core 100, illustrated in FIG. 28, including a sector-shaped plate-like yoke portion 110 and a tooth portion 120 projecting perpendicularly from a sector-shaped flat surface of the yoke portion 110. In the case of forming such a dust core 100, a mold 500 illustrated in FIGS. 29 and 30 may be used. The mold 500 includes a die 510 having a sector-shaped mold hole 510$h$, and an upper punch 520 and a lower punch 530 that are fitted into the mold hole 510$h$ of the die 510. The die 510 shapes the peripheral surface of the yoke portion 110. The upper punch 520 has an end surface 520$f$ that shapes the lower surface (a surface opposite a surface from which the tooth portion 120 projects) of the yoke portion 110. The lower punch 530 includes a first lower punch 540 and a second lower punch 550. The first lower punch 540 has a through hole 540$h$ that shapes the peripheral surface of the tooth portion 120, and an annular end surface 540$o$ that shapes the toothed surface of the yoke portion 110 from which the tooth portion 120 projects. The annular end surface 540$o$ is a flat surface. The second lower punch 550 is inserted into the through hole 540$h$ of the first lower punch 540 and has an end surface 550$f$ that shapes the upper end surface of the tooth portion 120.

Figure 30:
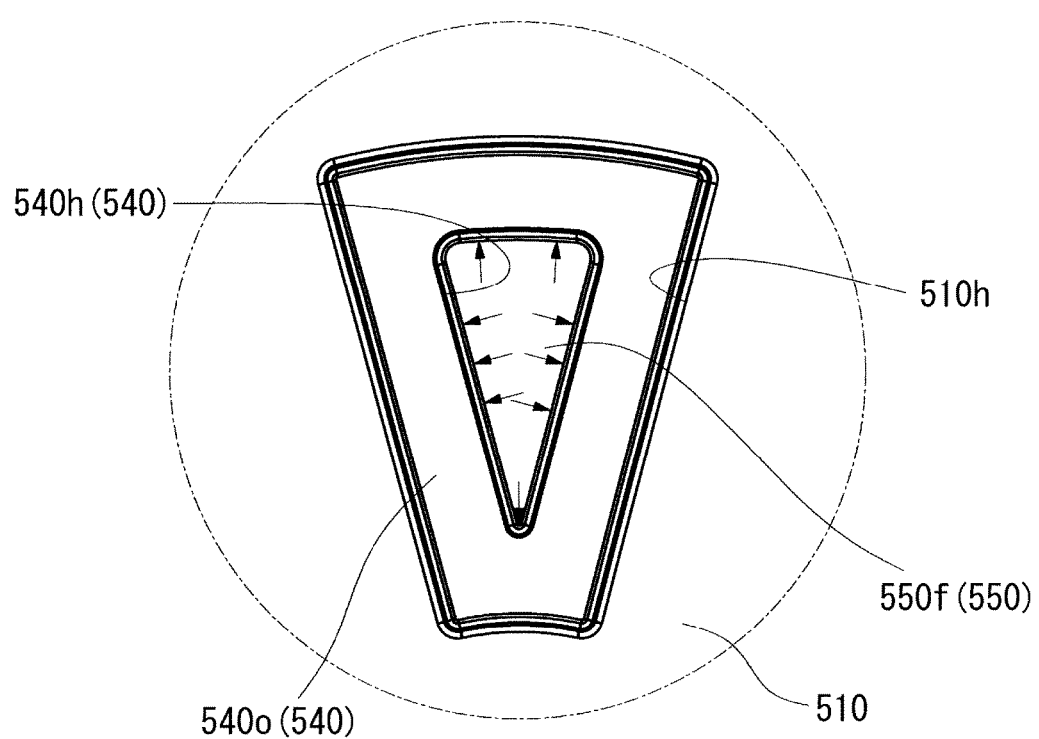
FIG. 30 is an enlarged top view, seen from the upper surface of a die, of relevant part of the mold illustrated in FIG. 29.

To form the dust core 100 with the above mold 500, raw material powder containing soft magnetic powder as a chief component is fed into a cavity of the mold 500 that is defined by the mold hole 510$h$ of the die 510 and the lower punch 530, and the powder is compacted between the upper punch 520 and the lower punch 530, whereby the dust core 100 is formed. When the raw material powder is compacted, since the powder is compacted, lateral pressure acts on the inner peripheral surface of the through hole 540$h$ provided in the first lower punch 540. In FIG. 30, black arrows each represent the lateral pressure acting on the first lower punch 540. Since the lateral pressure acts on the first lower punch 540, the through hole 540$h$ of the first lower punch 540 is widened. Consequently, stress is concentrated at the inner corners of the first lower punch 540, leading to damage to the first lower punch 540. Such knowledge has been reached. In particular, if the compacting pressure is increased for increasing the density of the dust core 100, the lateral pressure acting on the first lower punch 540 increases. Therefore, the first lower punch becomes more easily deformable and damageable.

Advantageous Effects of Invention

The dust core according to the present disclosure can have a high density and can be manufactured with high productivity. The above stator core and the stator each include high-density dust cores forming the stator core and can exhibit improved magnetic characteristics.

Description of Embodiments of Invention

Embodiments of the present invention will now be listed and described.

(1) A dust core according to an embodiment of the present invention is a dust core included in an axial-gap rotary electric machine, the dust core comprising:
a sector-shaped plate-like yoke portion; and
a tooth portion integrated with the yoke portion and projecting from the yoke portion,
wherein, denoting one of surfaces of the yoke portion from which the tooth portion projects as a toothed surface, the toothed surface has a concave portion provided between a peripheral edge of the tooth portion and a peripheral edge of the yoke portion.

The above dust core has the concave portion in the toothed surface of the yoke portion. Therefore, a mold for forming the dust core includes a first lower punch having an annular end surface on which a convex portion conforming to the concave portion is provided. In a case where the dust core is formed with such a mold (the first lower punch), when raw material powder is compacted, the convex portion is stuck into the raw material powder, whereby an anchor effect is produced. Therefore, the deformation of the first lower punch under the lateral pressure is suppressed. Hence, even if the compacting pressure is increased for increasing the density of the dust core, the stress occurring at the inner corners of the first lower punch can be reduced. Consequently, the first lower punch becomes less likely to be damaged. Since the occurrence of damage to the mold (the first lower punch) can be suppressed, the above dust core can have a high density and can be manufactured with high productivity.

(2) In an embodiment of the above dust core, the concave portion extends along each of peripheral edges of the yoke portion that are on two respective sides in a circumferential direction of the yoke portion.

If the concave portion extends along each of peripheral edges of the yoke portion that are on two respective sides in the circumferential direction, the convex portion provided on the annular end surface of the first lower punch extends along each of peripheral edges of the first lower punch that are on two respective sides in the circumferential direction. Therefore, the deformation of the first lower punch under the lateral pressure occurring at the time of compacting can be suppressed effectively. Accordingly, a great effect of reducing the stress occurring at the inner corners of the first lower punch can be produced, and the occurrence of damage to the first lower punch can be suppressed effectively. Consequently, the dust core can have a higher density.

(3) In an embodiment of the above dust core, the concave portion extends along an entire peripheral edge of the tooth portion.

If the concave portion extends along the entire peripheral edge of the tooth portion, the convex portion provided on the annular end surface of the first lower punch extends along the entire peripheral edge of the through hole provided in the first lower punch. Therefore, the deformation of the first lower punch under the lateral pressure occurring at the time of compacting can be suppressed further. Accordingly, a greater effect of reducing the stress occurring at the inner corners of the first lower punch can be produced, and the occurrence of damage to the first lower punch can be suppressed further. Consequently, the dust core can have a much higher density.

(4) In an embodiment of the above dust core, the concave portion has an inclined surface inclining toward the tooth portion.

If the concave portion has an inclined surface inclining toward the tooth portion, the convex portion provided on the annular end surface of the first lower punch has an inclined surface inclining toward the through hole in such a manner as to conform to the above inclined surface. When the raw material powder is compacted, a pressure acts on the inclined surface of the convex portion. The inclined surface inclines toward the through hole. Therefore, the pressure received by the inclined surface acts in such a direction that the lateral pressure acting on the inner peripheral surface of the through hole of the first lower punch is cancelled out. Hence, utilizing the pressure received by the inclined surface of the convex portion at the time of compacting, at least part of the lateral pressure acting on the first lower punch can be cancelled out, and the deformation of the first lower punch under the lateral pressure can be suppressed further. Accordingly, the stress occurring at the inner corners of the first lower punch can be reduced further, and the occurrence of damage to the first lower punch can be suppressed further. Consequently, the dust core can have a high density and can be manufactured with improved productivity.

(5) In an embodiment of the dust core, the dust core has a relative density of 90% or higher.

If the density of the dust core is increased, magnetic characteristics (flux density, magnetic permeability, and so forth) of the dust core can be improved. If the dust core has a relative density of 90% or higher, the dust core can exhibit excellent magnetic characteristics.

A more preferable relative density is 93% or higher.

(6) A stator core according to an embodiment of the present invention is a stator core included in an axial-gap rotary electric machine, the stator core comprising:

the dust core according to any of (1) to (5) described above, wherein a plurality of dust cores are combined together annularly.

The above stator core includes the dust cores according to any of the above embodiments of the present invention. Therefore, the dust cores each have a high density, and the stator core can exhibit improved magnetic characteristics.

(7) A stator according to an embodiment of the present invention is a stator included in an axial-gap rotary electric machine, the stator comprising:

the stator core according to (6) described above; and coils provided on the tooth portions of the dust cores forming the stator core.

The above stator includes the stator core according to the above embodiment of the present invention. Therefore, the dust cores forming the stator core each have a high density, and the stator can exhibit improved magnetic characteristics.

DETAILS OF EMBODIMENTS OF INVENTION

Specific examples of the dust core, the stator core, and the stator according to the respective embodiments of the present invention will now be described with reference to the drawings, wherein like reference numerals denote like or equivalent elements. The present invention is not limited to the following examples. The scope of the present invention is defined by the appended claims and is intended to encompass all equivalents of the claims and all modifications of the claims that are made within the scope.

<Dust Core>

Embodiment 1

Referring to FIGS. 1 to 4, a dust core 10 according to Embodiment 1 will now be described. The dust core 10 is a dust core included in an axial-gap rotary electric machine. More specifically, the dust core 10 is a dust core included in a stator core and includes a sector-shaped plate-like yoke portion 11, and tooth portions 12 projecting from the yoke portion 11. One of features of the dust core 10 is that, denoting one of surfaces of the yoke portion 11 from which the tooth portions 12 project as a toothed surface 15, the toothed surface 15 has concave portions 30 each provided between a peripheral edge of a corresponding one of the tooth portions 12 and a peripheral edge of the yoke portion 11. Hereinafter, the dust core 10 is described with a side thereof from which the tooth portions 12 project being defined as the upper side, and the opposite side being defined as the lower side.

(Yoke Portion)

Figure 1:
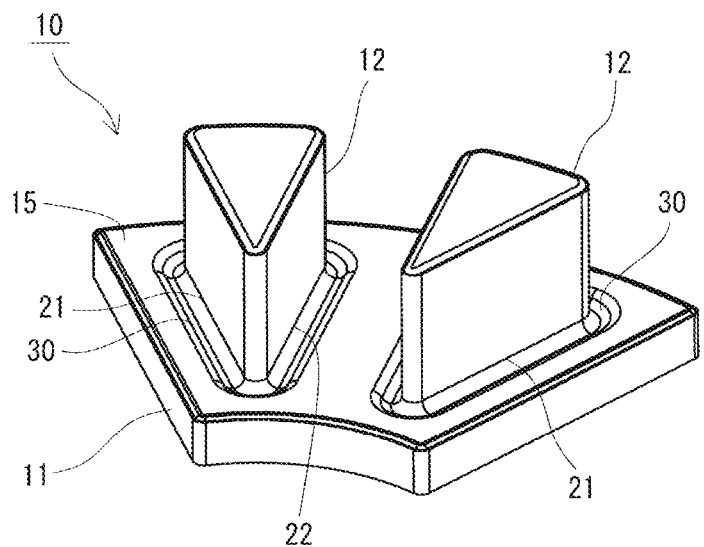
FIG. 1 is a perspective view of a dust core according to Embodiment 1.
Figure 2:
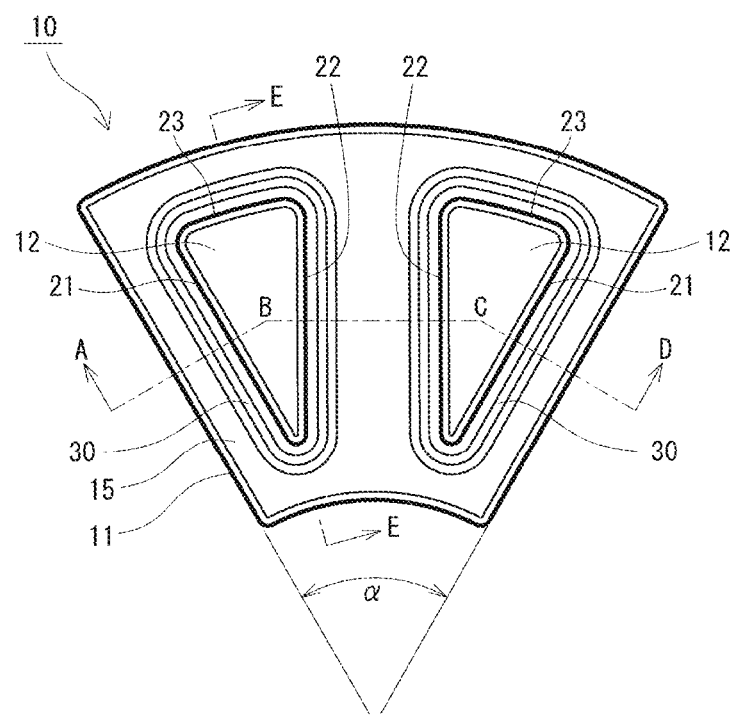
FIG. 2 is a plan view of the dust core illustrated in FIG. 1.

As illustrated in FIGS. 1 and 2, the yoke portion 11 is a sector-shaped plate-like portion included in the dust core 10. The yoke portion 11 has sector-shaped flat surfaces, from one (the front one) of which the tooth portions 12 project. The one surface forms the toothed surface 15. In the present embodiment, the yoke portion 11 has a thickness Ty of 4.9 mm, a width Wy of 34.6 mm, and a center angle α of 60° (see FIGS. 2 and 4).

(Tooth Portion)

As illustrated in FIGS. 1 and 2, the tooth portions 12 are integrated with the yoke portion 11 and project perpendicularly from the toothed surface 15 of the yoke portion 11. In the present embodiment, the tooth portions 12 each have a triangular pole shape, with an upper end surface thereof having a triangular shape or more specifically an isosceles triangular shape. The shape of each tooth portion 12 is not limited to the above. For example, the end surface of the tooth portion 12 may be a trapezoidal shape or the like. In addition, the terms "triangular shape" and "trapezoidal shape" may not strictly be triangular and trapezoidal in terms of geometry and are not limited to perfect triangular and trapezoidal shapes. The terms "triangular shape" and "trapezoidal shape" each encompass any shape that is substantially triangular or trapezoidal, including those with round corners. In the case of an axial-gap rotary electric machine, the larger a facing area of each tooth portion 12 that faces the rotor, the more advantageous in terms of performance improvement. Therefore, it is preferable to appropriately determine the shape (the shape of the end surface) of the tooth portion 12 such that the tooth portion 12 has a large facing area. The number of tooth portions 12 may be one or more. In the present embodiment, two tooth portions 12 that are adjacent to each other are provided. In the case of an axial-gap rotary electric machine, a magnetic circuit is formed of two tooth portions 12 that are adjacent to each other with the yoke portion 11 interposed therebetween. Therefore, it is preferable to set the number of tooth portions 12 to 2n (where n is a natural number).

As illustrated in FIG. 2, the peripheral edge of each of the tooth portions 12 includes two side edges 21 and 22 each intersecting the circumferential direction of the yoke portion 11, and an outer peripheral edge 23 positioned on the radially outer side of the yoke portion 11 and intersecting the two side edges 21 and 22. The two side edges 21 and 22 are each longer than the outer peripheral edge 23. The side edges 21 of the respective tooth portions 12 that are positioned on the outer side in the circumferential direction of the yoke portion 11 extend along peripheral edges of the yoke portion 11 that are on two respective sides of the yoke portion 11 in the circumferential direction. The circumferential direction of the yoke portion 11 corresponds to the circumferential direction of an annular stator core 210 (see FIG. 23) that is obtained by combining a plurality of dust cores 10 together as to be described below. In the present embodiment, the tooth portions 12 each have a width Wt of 22.4 mm and a height Ht of 12.9 mm, and a distance L from the peripheral edge of the tooth portion 12 to the peripheral edge of the yoke portion 11 is 6.1 mm (see FIGS. 3 and 4).

(Concave Portion)

The concave portions 30 are provided in the toothed surface 15. In the present embodiment, as illustrated in FIG. 2, the concave portions 30 each extend along the entire peripheral edge of a corresponding one of the tooth portions 12. Each concave portion 30 only needs to be provided between the peripheral edge of a corresponding one of the tooth portions 12 and the peripheral edge of the yoke portion 11. Furthermore, the concave portion 30 may have a continuous annular shape or may be divided in the circumferential direction of the annular shape into a plurality of parts. It is preferable that the concave portion 30 be present along at least a corresponding one of peripheral edges of the yoke portion 11 that are on two respective sides in the circumferential direction of the yoke portion 11. It is more preferable that the concave portion 30 be present along the side edge 21 of the tooth portion 12. In the case where the concave portion 30 is present along a corresponding one of the peripheral edges of the yoke portion 11 that are on the two respective sides in the circumferential direction of the yoke portion 11, when the dust core 10 is formed, the occurrence of damage to the mold (the first lower punch) can be suppressed effectively, as to be described below. In particular, as in the present embodiment where the concave portion 30 extends along the entire peripheral edge of the tooth portion 12, the occurrence of damage to the mold (the first lower punch) can be suppressed further. In addition, in a case of a dust core 10 including a pair of tooth portions 12 each partially provided with the concave portion 30, the concave portion 30 may be absent along the side edge 22.

Figure 3:
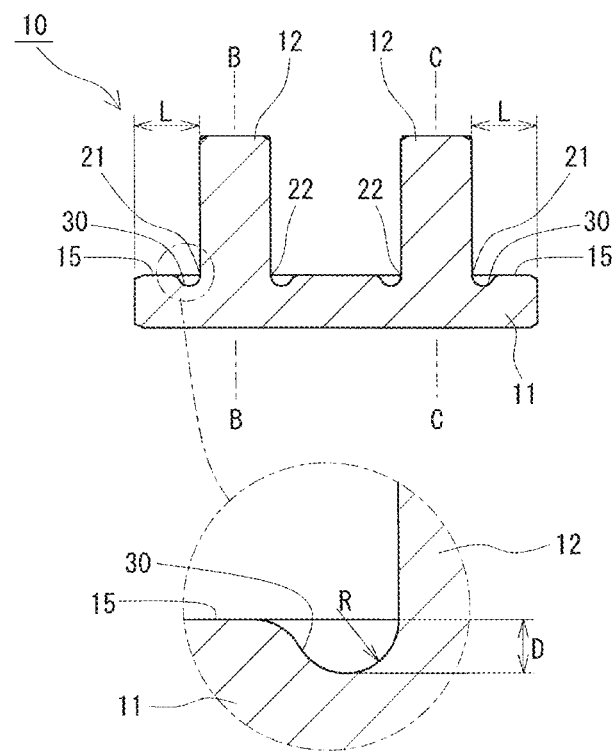
FIG. 3 is a sectional view taken along line A-B-C-D illustrated in FIG. 2.
Figure 4:
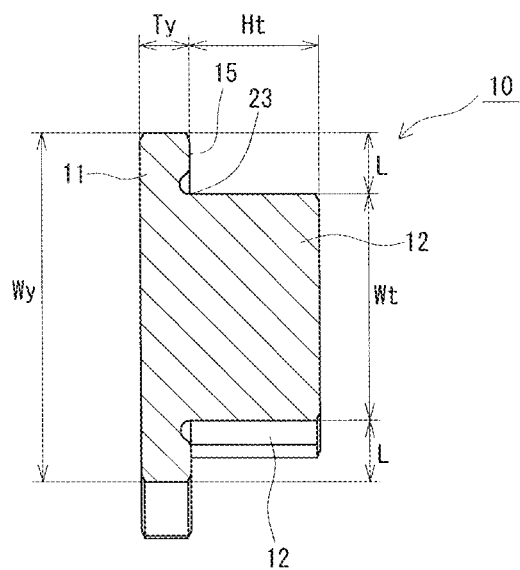
FIG. 4 is a sectional view taken along line E-E illustrated in FIG. 2.

As illustrated in FIGS. 3 and 4, the sectional shape of the concave portion 30 according to the present embodiment is semicircular, with an arc-shaped curved surface. The term "the sectional shape of the concave portion" refers to the shape of a section taken along a plane orthogonal to the longitudinal direction of the concave portion 30 (a plane orthogonal to the peripheral surface of the tooth portion 12). The sectional shape of the concave portion 30 is not limited to the above and may be, for example, a triangular shape (a V shape), a rectangular shape (a U shape), or the like. The term "semicircular shape," "triangular shape," and "rectangular shape" may not strictly be semicircular, triangular, and rectangular in terms of geometry and are each not limited to a perfect semicircular, triangular, or rectangular shape. The terms "semicircular shape," "triangular shape," and "rectangular shape" each encompass any shape that is regarded as being substantially semicircular, triangular, or rectangular. It is preferable that the concave portion 30 have a sectional shape with round (R-shaped) corners. In such a case, the occurrence of cracks developing from the corners can be suppressed easily. If the corners each have an R shape, it is preferable that the corner have a curvature radius of 0.2 mm or greater.

The concave portion 30 has a depth of, for example, 0.5 mm or greater and 2.5 mm or smaller. If the concave portion 30 has a depth of 0.5 mm or greater, the occurrence of damage to the mold (the first lower punch) can be suppressed easily. If the concave portion 30 has a depth of 2.5 mm or smaller, the reduction in the area of a magnetic path in the yoke portion 11 that is attributed to the concave portion 30 can be suppressed. Accordingly, the deterioration in magnetic characteristics due to the reduction in the area of the magnetic path can be suppressed easily. It is preferable that the concave portion 30 have a depth of, for example, 1 mm or greater and 2 mm or smaller. In the present embodiment, the concave portion 30 has a curvature radius R of 1 mm and a depth D of 1 mm (see FIG. 3).

(Material)

The dust core 10 is obtained by compacting soft magnetic powder and is chiefly made of soft magnetic powder. The soft magnetic powder is powder of a soft magnetic material and contains a plurality of particles. For example, the soft magnetic powder contains at least one kind of powder that is selected from the following: pure iron (with a purity of 99% by mass or higher), and iron-based alloys such as an Fe—Si—Al-based alloy (sendust), an Fe—Si-based alloy (silicon steel), an Fe—Al-based alloy, and an Fe—Ni-based alloy (permalloy). It is preferable that the soft magnetic powder forming the dust core 10 have an insulating coating provided over the surface of each of the particles thereof. If the soft magnetic powder has an insulating coating provided over the surface of each of the particles thereof, the insulating coating assuredly electrically insulates the particles from one another. Therefore, the iron loss in the dust core 10 that is attributed to eddy current loss can be reduced. The insulating coating may be, for example, a phosphate coating, a silica coating, or the like.

(Relative Density)

It is preferable that the dust core 10 have a relative density of 90% or higher. With such a high density, magnetic characteristics can be improved. A more preferable relative density is 93% or higher. The term "relative density" refers to the ratio (%) of the actual density of the dust core to the true density of the dust core (the soft magnetic powder).

<Method of Manufacturing Dust Core>

A specific exemplary method of manufacturing the dust core 10 according to Embodiment 1 will now be described. A method of manufacturing the dust core includes a feeding step in which raw material powder containing soft magnetic powder as a chief component is fed into a cavity of a mold, a shaping step in which the fed raw material powder is compacted and shaped into a dust core, and a removing step in which the dust core is removed from the mold. One of features of the method of manufacturing the dust core is the mold used for forming the dust core. The method of manufacturing the dust core will now be described in detail with reference to the drawings. The following description begins with description of the mold, followed by description of each of the steps included in the manufacturing method.

<Mold>

Figure 5:
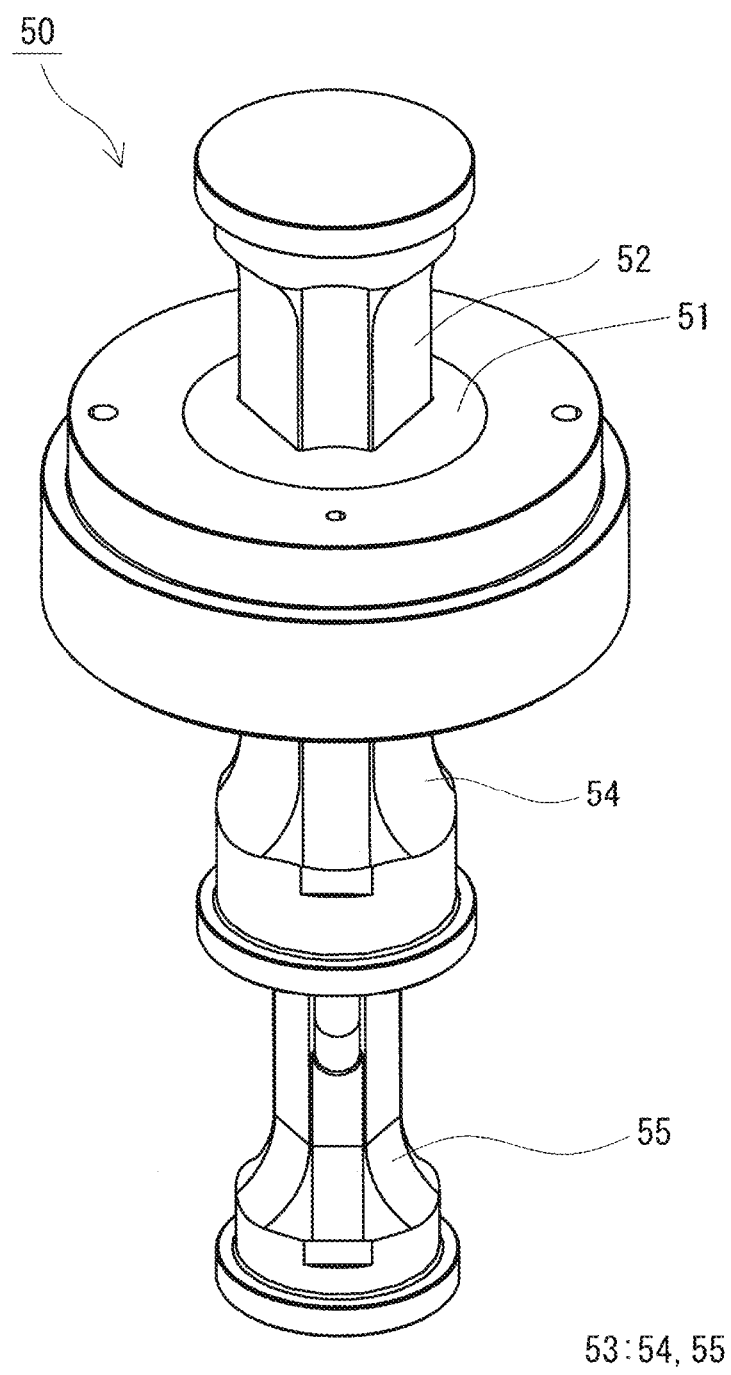
FIG. 5 is an overall perspective view of an exemplary mold for forming the dust core according to Embodiment 1.
Figure 6:
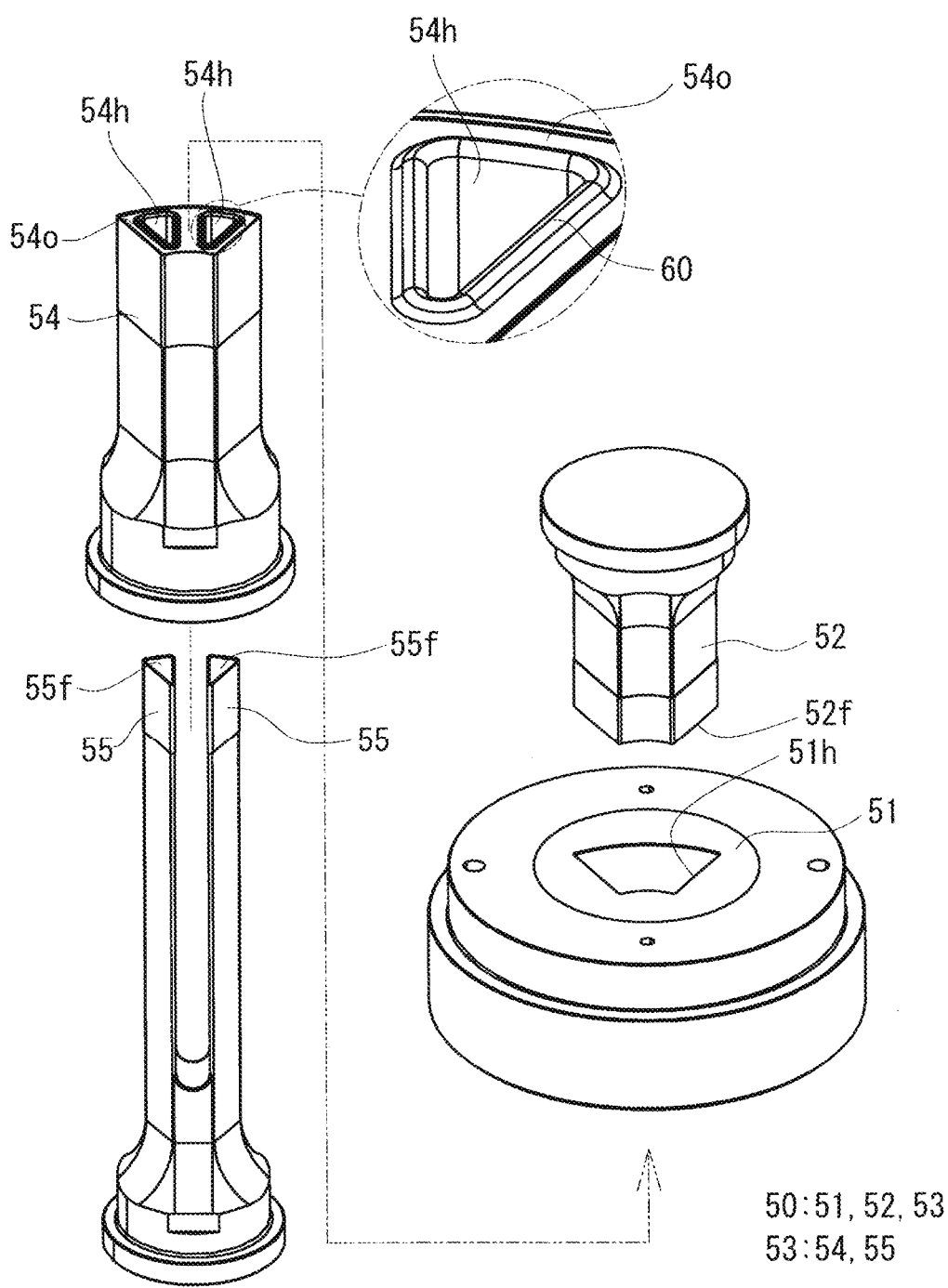
FIG. 6 is an exploded perspective view of the mold illustrated in FIG. 5.
Figure 7:
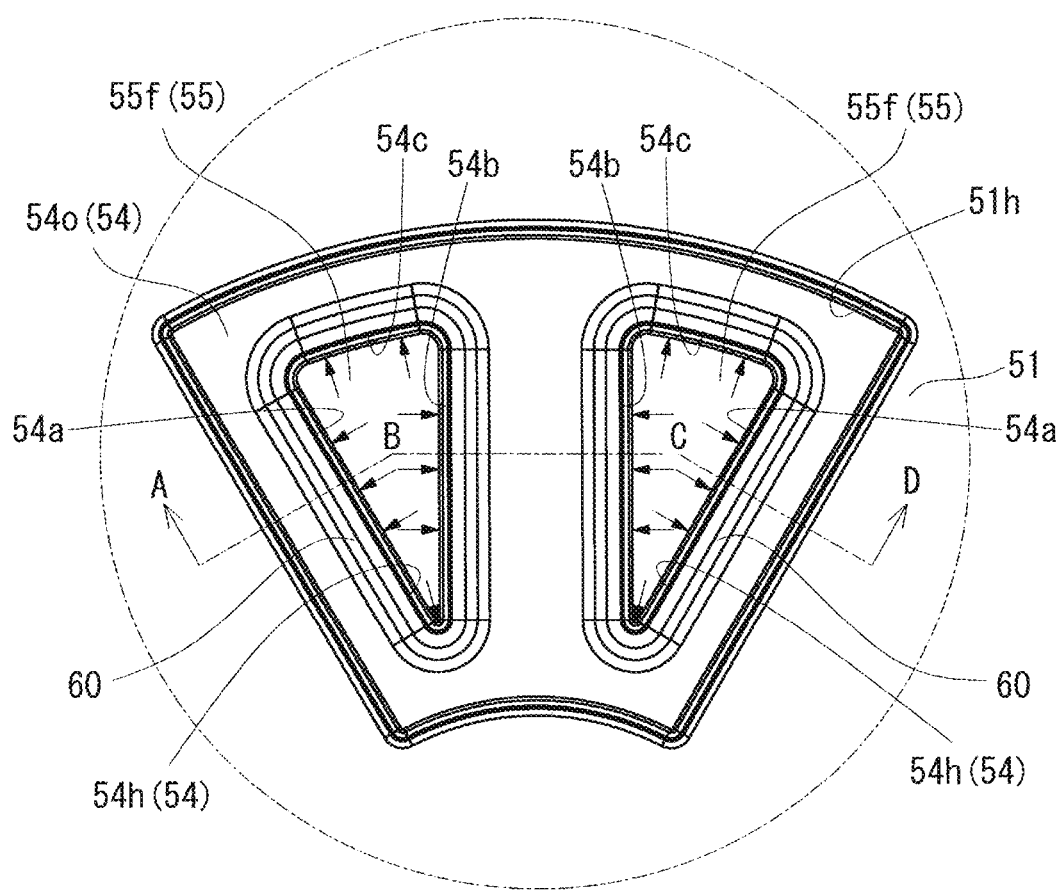
FIG. 7 is an enlarged top view, seen from the upper surface of a die, of relevant part of the mold illustrated in FIG. 5.
Figure 8:
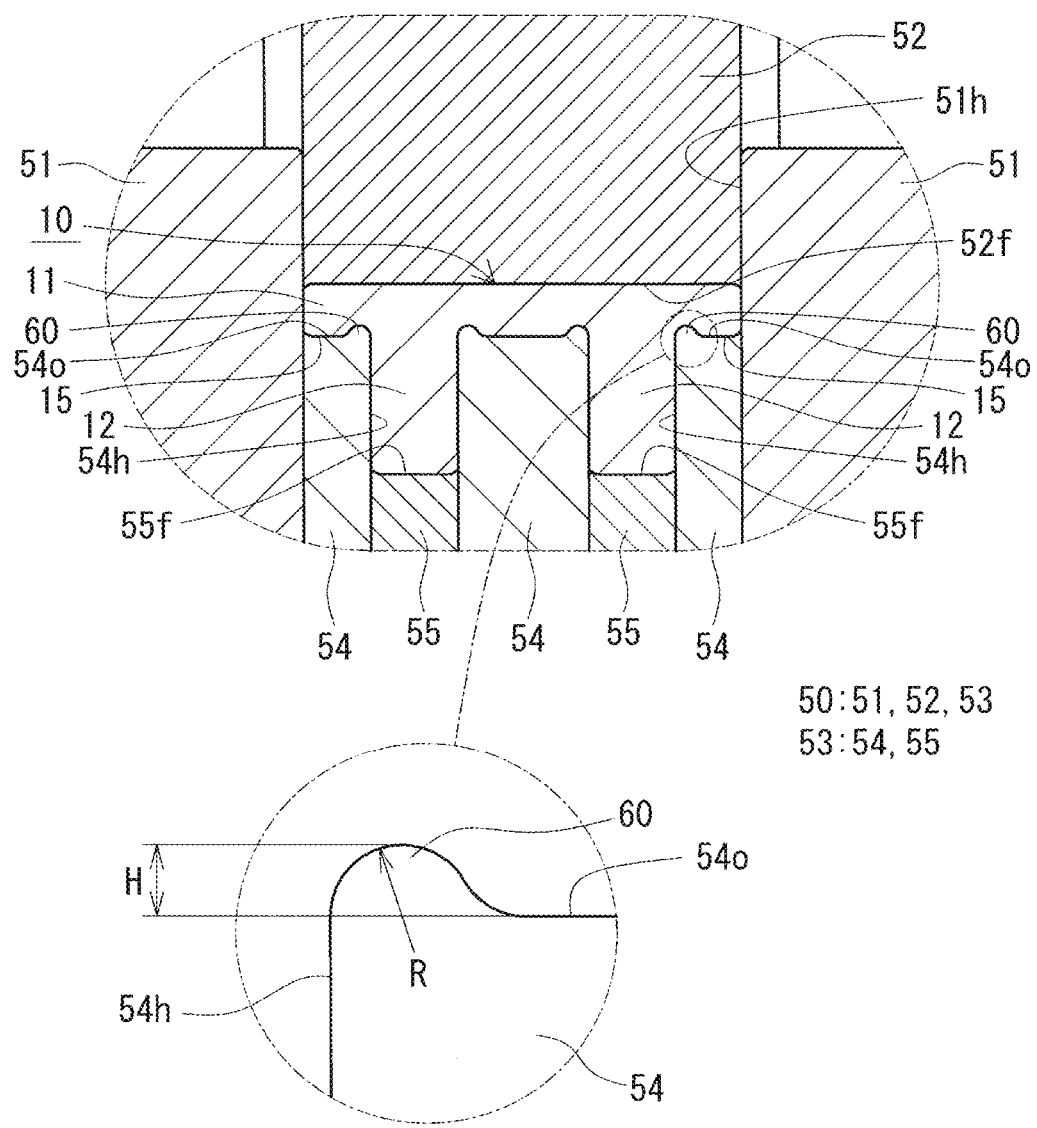
FIG. 8 is a sectional view taken along line A-B-C-D illustrated in FIG. 7.

A specific example of the mold for forming the dust core 10 will be described with reference to FIGS. 5 to 8. As illustrated in FIGS. 5 and 6, a mold 50 includes a die 51 having a mold hole 51h, and an upper punch 52 and a lower punch 53 (a first lower punch 54 and second lower punches 55) to be fitted into the mold hole 51h of the die 51. The mold hole 51h of the die 51 and the lower punch 53 define the cavity into which the raw material powder is fed. In FIG. 7, black arrows each represent lateral pressure acting on the first lower punch 54 when the raw material powder is compacted. FIG. 8 is a schematic vertical sectional view of relevant part of the mold 50 and illustrates a state where the raw material powder has been compacted into a dust core 10.

(Die)

As illustrated in FIGS. 6 and 7, the die 51 has the sector-shaped mold hole 51h extending therethrough in the vertical direction and shapes the peripheral surface of the yoke portion 11 (see FIG. 8).

(Upper Punch)

As illustrated in FIGS. 5 and 6, the upper punch 52 is positioned on the upper side of the die 51 and has a sector-shaped end surface 52f that shapes the lower surface (the surface opposite the toothed surface 15) of the yoke portion 11 (see FIG. 8). The upper punch 52 is movable in the vertical direction and compacts the raw material powder fed into the cavity in cooperation with the lower punch 53.

(Lower Punch)

As illustrated in FIGS. 5 and 6, the lower punch 53 is positioned on the lower side of the die 51 and includes the first lower punch 54 and the second lower punches 55. The first lower punch 54 and the second lower punches 55 are each movable relative to the die 51 in the vertical direction independently of each other.

(First Lower Punch)

As illustrated in FIGS. 6 and 7, the first lower punch 54 is fitted into the mold hole 51h of the die 51.

The first lower punch 54 has through holes 54h each extending therethrough in the vertical direction. The upper end surface of the first lower punch 54 forms an annular end surface 54o having openings of the respective through holes 54h. As illustrated in FIG. 8, the first lower punch 54 shapes the peripheral surfaces of the tooth portions 12 at the through holes 54h thereof and also shapes the toothed surface 15 at the annular end surface 54o thereof. In the present embodiment, two through holes 54h that are adjacent to each other are provided in correspondence with the tooth portions 12. The through holes 54h each have a triangular-pole shape.

As illustrated in FIG. 7, the peripheral edge of each of the through holes 54h includes two side edges 54a and 54b each intersecting the circumferential direction of the first lower punch 54, and an outer peripheral edge 54c positioned on the radially outer side of the first lower punch 54 and intersecting the two side edges 54a and 54b. The two side edges 54a and 54b are each longer than the outer peripheral edge 54c. The side edge 54a of each through hole 54h that is on the outer side in the circumferential direction of the first lower punch 54 extends along a peripheral edge of the first lower punch 54 that is on a corresponding one of two sides in the circumferential direction of the first lower punch 54. The circumferential direction of the first lower punch 54 corresponds to the circumferential direction of the yoke portion 11 (see FIG. 2). When a plurality of dust cores 10 are combined to form an annular stator core 210 (see FIG. 23), the circumferential direction of the first lower punch 54 corresponds to the circumferential direction of the stator core 210.

As illustrated in FIGS. 6 and 7, the second lower punches 55 each have a triangular end surface 55f (see FIG. 8) that is inserted into a corresponding one of the through holes 54h from the lower end of the first lower punch 54 and at which the upper end surface of a corresponding one of the tooth portions 12 is shaped. In the present embodiment, in correspondence with the tooth portions 12, two second lower punches 55 to be inserted into the respective through holes 54h of the first lower punch 54 are provided. That is, the second lower punches 55 form two branch members, respectively.

(Convex Portion)

As illustrated in FIG. 6, one of features of the mold 50 is that the annular end surface 54o of the first lower punch 54 has convex portions 60. As illustrated in FIG. 8, the convex portions 60 shape the respective concave portions 30 (see FIG. 3) of the dust core 10. When the dust core 10 is formed, the shapes of the convex portions 60 are transferred, whereby the concave portions 30 are formed in the toothed surface 15 of the yoke portion 11. In the present embodiment, as illustrated in FIG. 6, the convex portions 60 each extend along the entire peripheral edge of a corresponding one of the through holes 54h in correspondence with the concave portions 30 of the dust core 10. Each convex portion 60 only needs to be provided between the peripheral edge of a corresponding one of the through holes 54h and the peripheral edge of the first lower punch 54. It is preferable that the convex portion 60 be present along at least a corresponding one of the peripheral edges of the first lower punch 54 that are on two respective sides in the circumferential direction of the first lower punch 54. Furthermore, the convex portion 60 may have a continuous annular shape or may be divided in the circumferential direction of the annular shape into a plurality of parts.

As illustrated in FIG. 8, the sectional shape of the convex portion 60 is semicircular. The term "the sectional shape of the convex portion" refers to the shape of a section taken along a plane orthogonal to the longitudinal direction of the convex portion 60 (a plane orthogonal to the peripheral edge of the through hole 54h). The sectional shape of the convex portion 60 may be, for example, a triangular shape (a V shape), a rectangular shape (a U shape), or the like. It is preferable that the convex portion 60 have a sectional shape with round (R-shaped) corners. In such a case, the occurrence of chipping of the convex portion 60 can be suppressed easily. If the corners each have an R shape, it is preferable that the corner have a curvature radius of 0.2 mm or greater.

The convex portion 60 has a height of, for example, 0.5 mm or greater and 2.5 mm or smaller. If the convex portion 60 has a height of 0.5 mm or greater, the occurrence of damage to the first lower punch 54 can be suppressed easily.

If the convex portion 60 has a height of 2.5 mm or smaller, the occurrence of chipping of the convex portion 60 can be suppressed easily. It is preferable that the convex portion 60 have a height of, for example, 1 mm or greater and 2 mm or smaller. In the present embodiment, the convex portion 60 has a curvature radius R of 1 mm and a height H of 1 mm (see FIG. 8).

(Material)

The material of the mold 50 is tool steel such as die steel or high-speed steel, or cemented carbide.

Now, the steps included in the method of manufacturing the dust core 10 will be described in order. One of the features of the method of manufacturing the dust core 10 is that the above mold 50 is used.

[Feeding Step]

In the feeding step, raw material powder containing soft magnetic powder as a chief component is fed into the cavity of the mold 50 that is defined by the mold hole 51$h$ of the die 51, the first lower punch 54, and the second lower punch 55.

The raw material powder contains soft magnetic powder as a chief component. The "chief component" composes 90% by mass or greater of the raw material powder, the amount of which is defined as 100% by mass. Lubricant, binder resin, or the like may be added to the raw material powder, according to need.

The mean particle size of the soft magnetic powder is, for example, 20 μm or greater and 300 μm or smaller, or 40 μm or greater and 250 μm or smaller. If the mean particle size of the soft magnetic powder is set within the above range, the soft magnetic powder can be handled with ease and can be easily shaped by compacting. The mean particle size of the soft magnetic powder refers to the particle size identified for particles amounting to 50% by mass of all particles measured with a laser-diffraction/scattering particle-size-distribution-analyzing device.

[Shaping Step]

In the shaping step, the fed raw material powder is compacted between the upper punch 52 and the first lower punch 54 and the second lower punch 55 into a dust core 10 (see FIG. 8).

The density of the dust core 10 can be increased by increasing the compacting pressure applied when the raw material powder (the soft magnetic powder) is compacted. The compacting pressure is set to, for example, 686 MPa or higher, or 980 MPa or higher. The upper limit of the compacting pressure is, for example, 1500 MPa or lower, from a mechanical point of view.

To increase the ease of compacting of the raw material powder, warm compacting in which the mold 50 is heated may be employed.

In that case, the compacting temperature (the mold temperature) is set to, for example, 60° C. or higher, or 80° C. or higher. The upper limit of the compacting temperature is, for example, 200° C. or lower.

[Removing Step]

In the removing step, the dust core 10 is removed from the mold 50.

In the removing step, after the raw material powder is compacted into the dust core 10, the upper punch 52 is lifted up and the first lower punch 54 and the second lower punch 55 are also lifted up relative to the die 51, for example. In such a method, the dust core 10 can be removed from the mold 50 (the die 51), whereby the dust core 10 can be obtained.

[Heat-Treatment Step]

After the dust core 10 is removed from the mold 50, a heat-treatment step in which heat treatment is performed on the dust core 10 may be added for eliminating any strain generated in the dust core 10 at the time of compacting.

If such heat treatment is performed on the dust core 10 and the strain is eliminated, the magnetic permeability can be improved. Thus, the iron loss occurring in the dust core 10 because of hysteresis loss can be reduced. The heat-treatment temperature is set to, for example, 400° C. or higher, or 600° C. or higher. The upper limit of the heat-treatment temperature is, for example, 900° C. or lower.

<Reason why Damage to First Lower Punch is Suppressed>

The reason why the occurrence of damage to the first lower punch 54 is suppressed by forming the dust core 10 with the above mold 50 will now be described. When raw material powder is compacted, lateral pressure acts on the inner peripheral surface of the through holes 54$h$ provided in the first lower punch 54 (see FIG. 7) because the powder is compacted. Since the lateral pressure acts on the first lower punch 54, the through holes 54$h$ of the first lower punch 54 tend to be widened. As illustrated in FIG. 8, the annular end surface 54$o$ of the first lower punch 54 has the convex portions 60 that shape the concave portions 30 of the dust core 10. Therefore, when the raw material powder is compacted, the convex portions 60 are stuck into the raw material powder, whereby an anchor effect is produced. Hence, against the lateral pressure acting on the first lower punch 54, the deformation of the first lower punch 54 under the lateral pressure is suppressed. Consequently, the stress occurring at the inner corners of the first lower punch 54 can be reduced, and the occurrence of damage to the first lower punch 54 can be suppressed.

As in the present embodiment, if the dust core 10 has two tooth portions 12 and the first lower punch 54 has two through holes 54$h$ in correspondence with the two tooth portions 12, the lateral pressures acting on the respective through holes 54$h$ cancel each other out in a portion of the first lower punch 54 that is between the two through holes 54$h$. Therefore, a portion of the inner peripheral surface of each through hole 54$h$ that extends along the side edge 54$b$ positioned on the inner side in the circumferential direction of the first lower punch 54 is less likely to be deformed by the lateral pressure. In contrast, a portion of the inner peripheral surface of each through hole 54$h$ that extends along the side edge 54$a$ positioned on the outer side in the circumferential direction of the first lower punch 54 is more likely to be deformed by the lateral pressure. Hence, it is preferable that the convex portion 60 be present along at least a corresponding one of the peripheral edges of the first lower punch 54 that are on the two respective sides in the circumferential direction of the first lower punch 54. In such a case, the deformation of the first lower punch 54 under the lateral pressure can be suppressed effectively. If the first lower punch 54 is partially provided with the convex portion 60, the convex portion 60 may be absent along the side edge 54$b$. In particular, if the convex portion 60 extends along the entire peripheral edge of the through hole 54$h$, the deformation of the first lower punch 54 under the lateral pressure can be suppressed further.

<Analysis of Stress Occurring in First Lower Punch>

Figure 9:
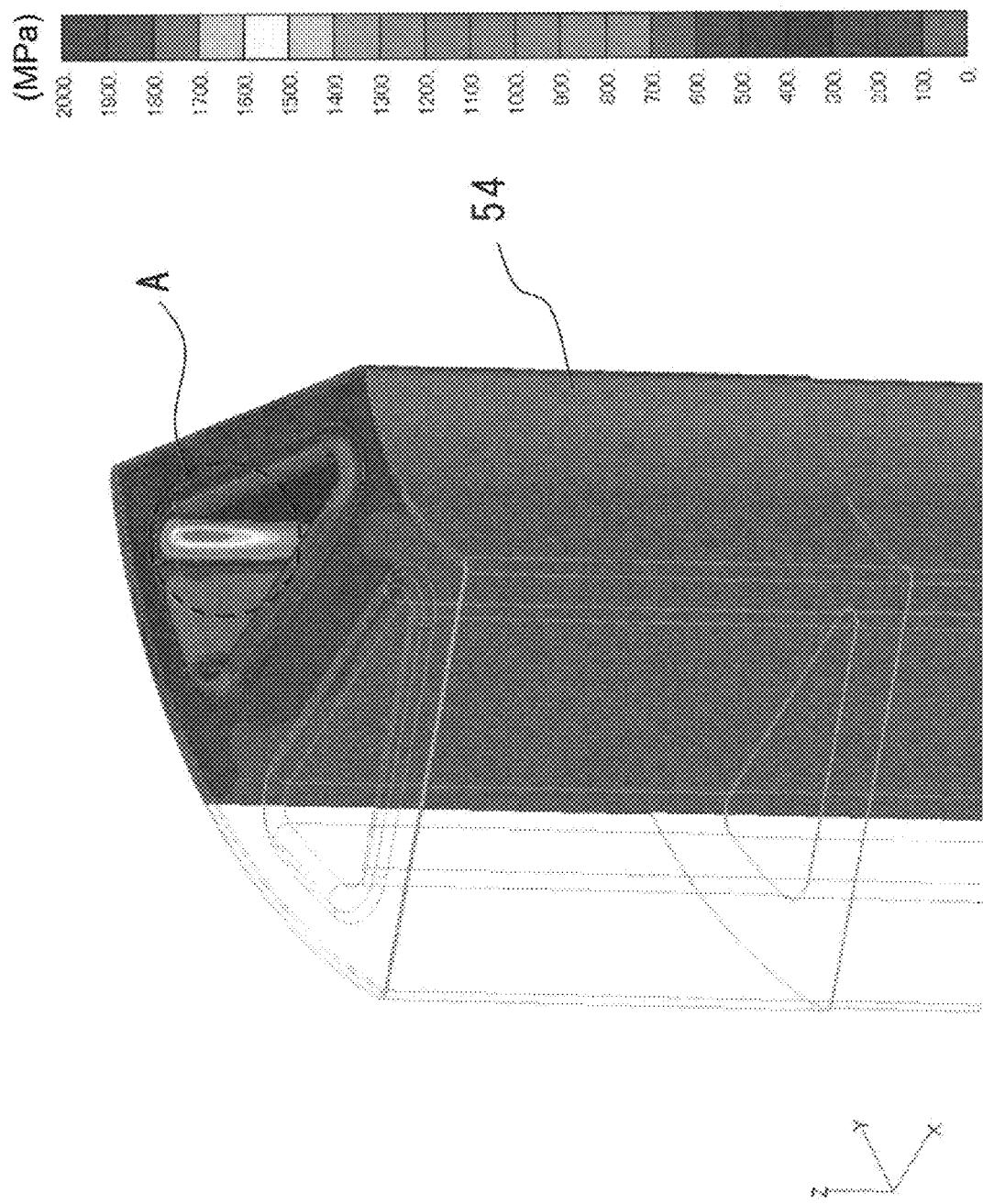
FIG. 9 is a diagram illustrating a distribution of stress that occurred in a first lower punch when the dust core according to Embodiment 1 was formed.
Figure 10:
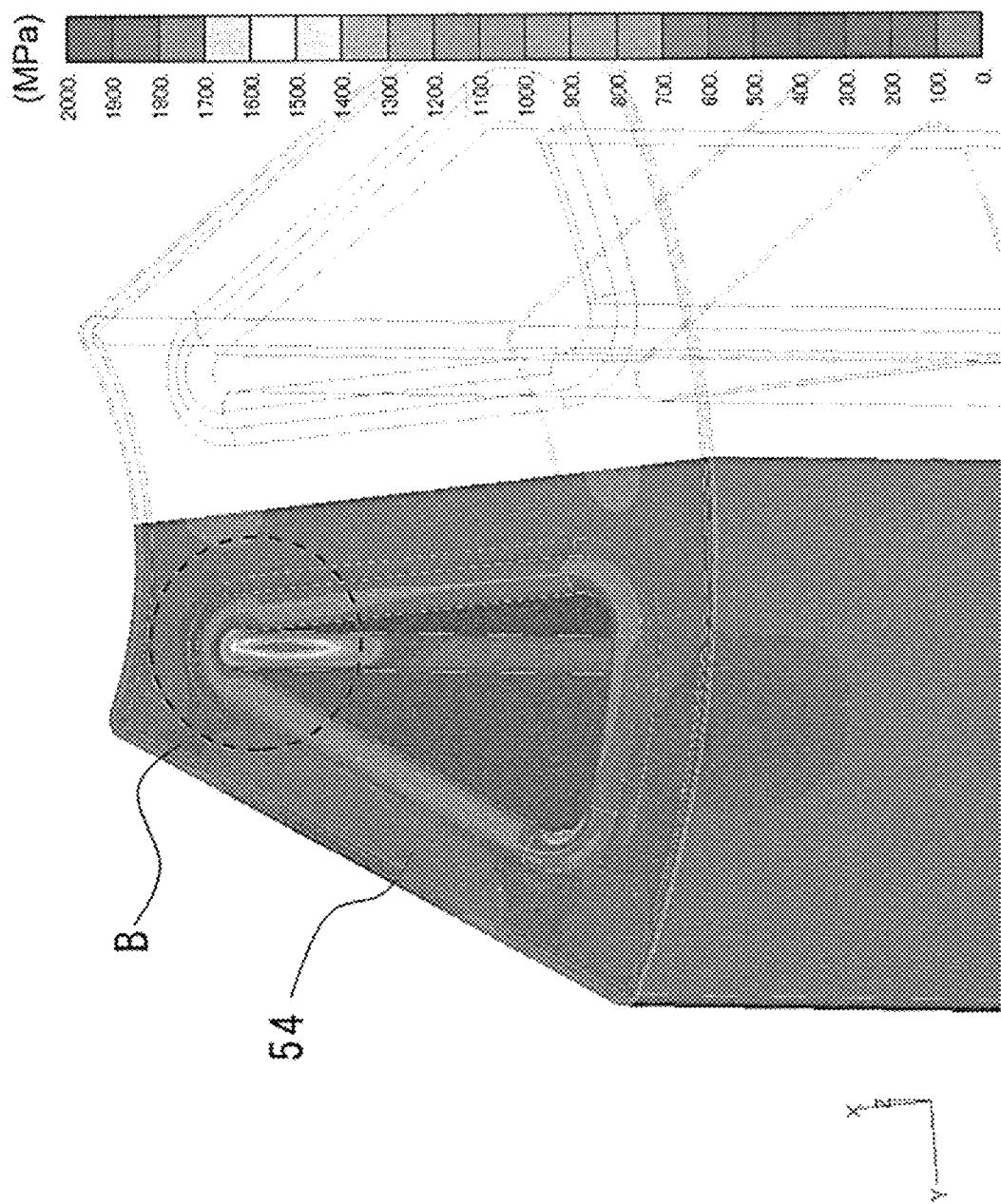
FIG. 10 is another diagram illustrating a distribution of stress that occurred in the first lower punch when the dust core according to Embodiment 1 was formed.
Figure 11:
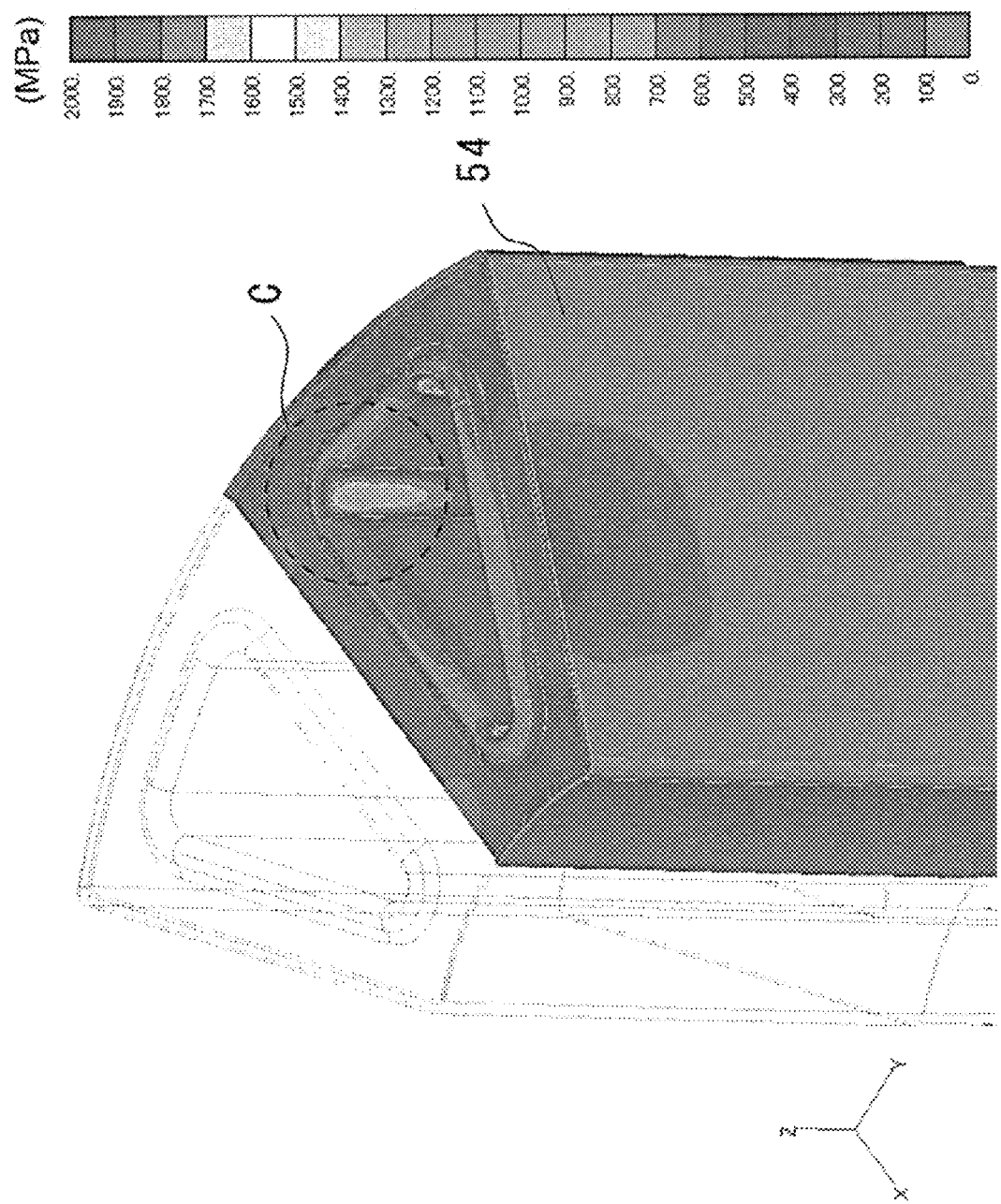
FIG. 11 is yet another diagram illustrating a distribution of stress that occurred in the first lower punch when the dust core according to Embodiment 1 was formed.

The distribution of stress acting on the first lower punch 54 at the time of forming the dust core 10 according to Embodiment 1 was analyzed by CAE (Computer Aided Engineering). Based on the result of the analysis by CAE, the maximum stresses occurring at the respective inner corners of the first lower punch 54 at the time of compacting were calculated. Herein, denoting the corner where the side edge 54a and the outer peripheral edge 54c of the through hole 54h, described with reference to FIG. 6, meet as corner A, the corner where the side edge 54a and the side edge 54b meet as corner B, and the corner where the side edge 54b and the outer peripheral edge 54c meet as corner C, the distributions of stress (unit: MPa) near the corners A to C of the first lower punch 54 are illustrated in FIGS. 9 to 11, respectively, and the maximum stresses at the respective corners A to C are summarized in Table 1. The analysis was conducted under a compacting pressure at the time of compacting of 980 MPa (10000 kgf/cm$^2$), with a Young's modulus of 206000 MPa and a Poisson's ratio of 0.3 as physical properties of the first lower punch 54.

Figure 12:
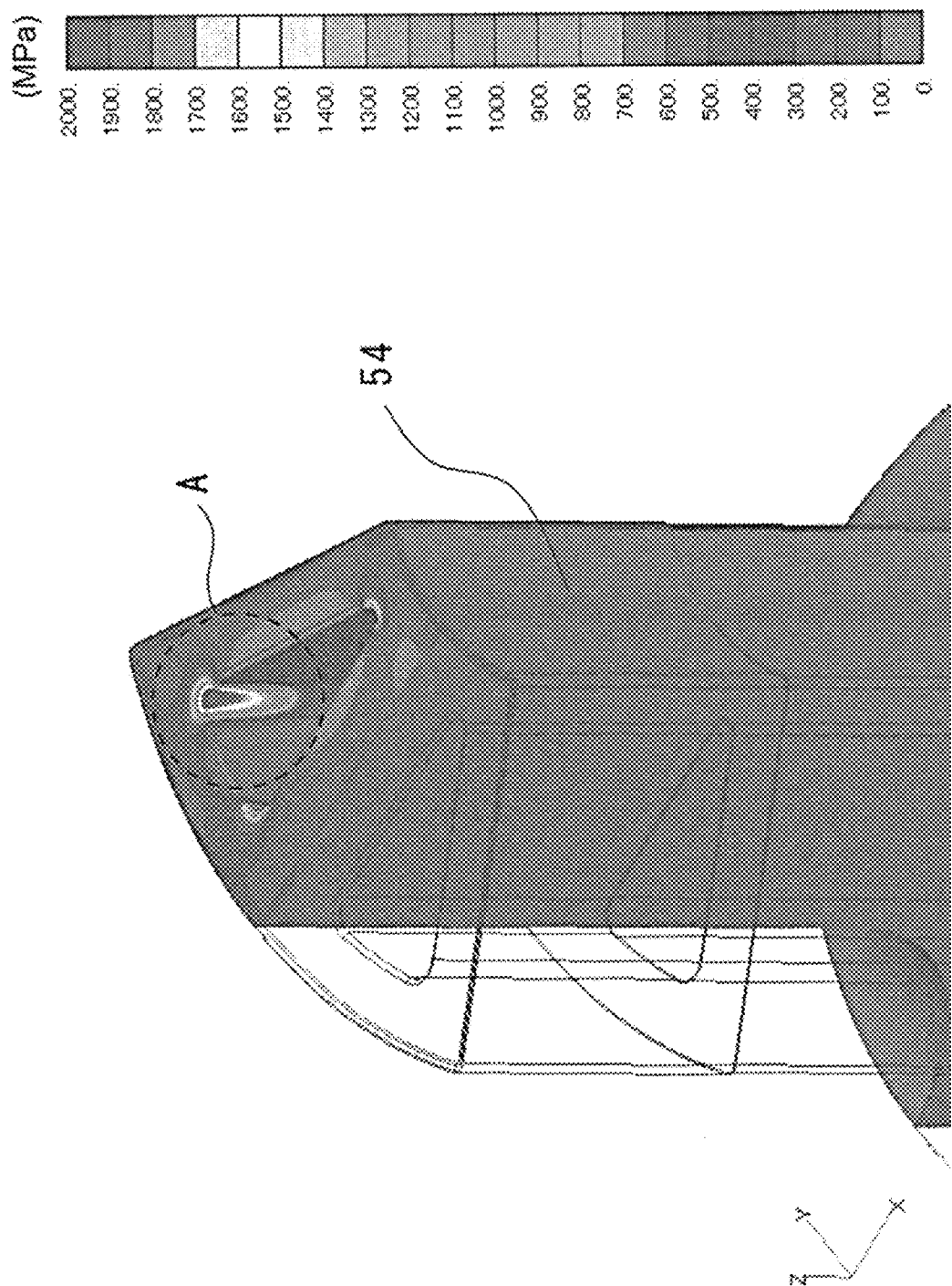
FIG. 12 is a diagram illustrating a distribution of stress that occurred in a first lower punch when a dust core according to a reference example was formed.
Figure 13:
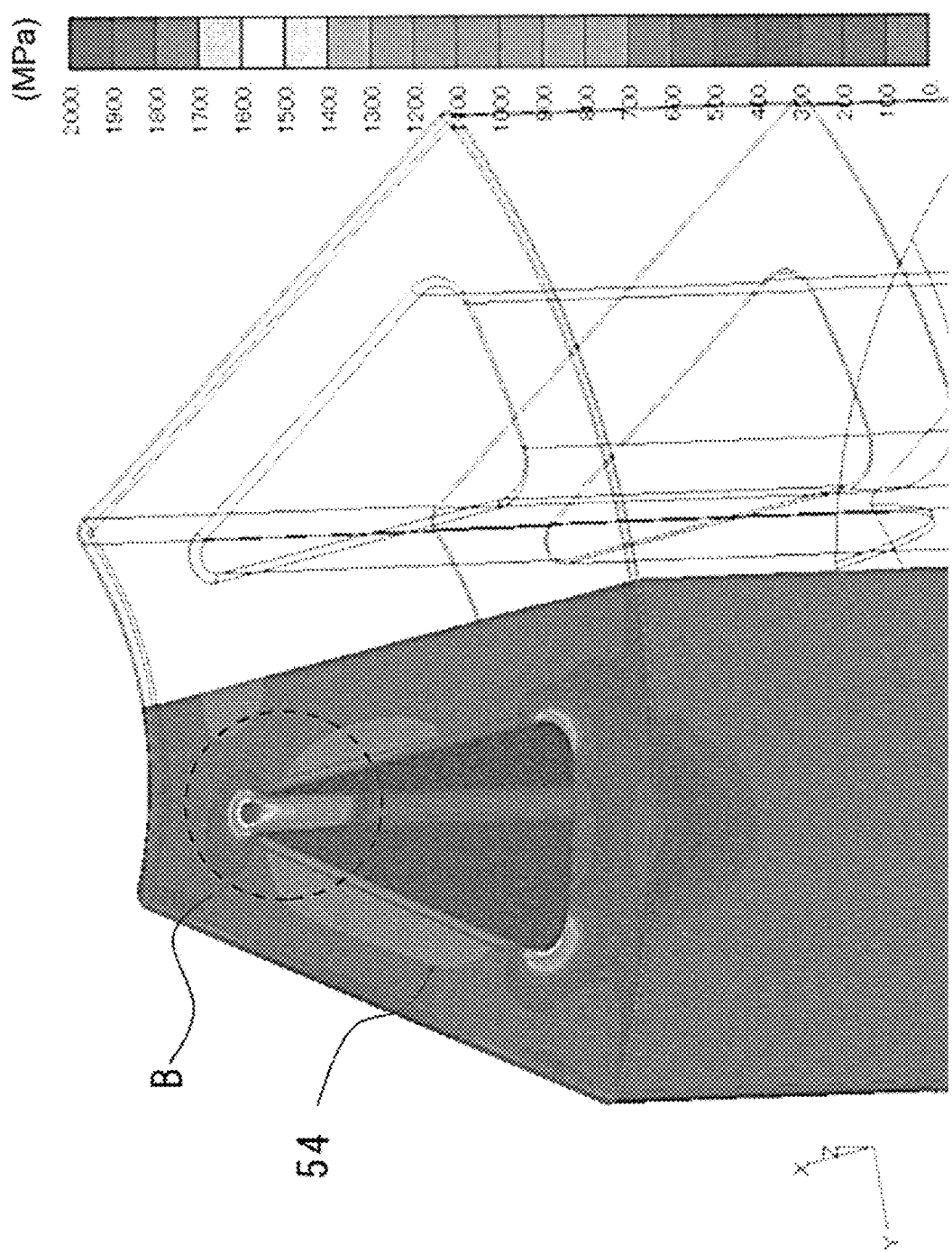
FIG. 13 is another diagram illustrating a distribution of stress that occurred in the first lower punch when the dust core according to the reference example was formed.
Figure 14:
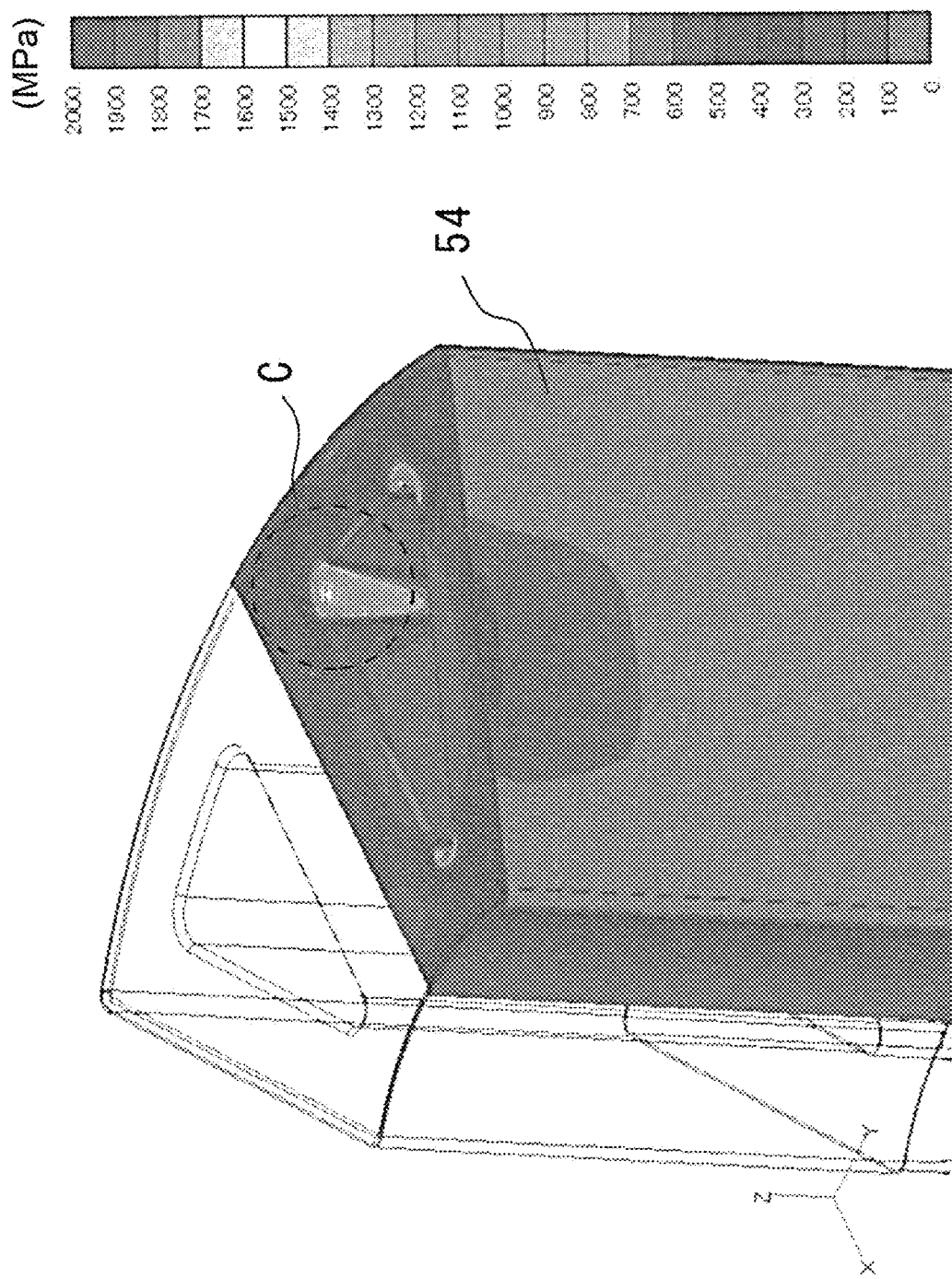
FIG. 14 is yet another diagram illustrating a distribution of stress that occurred in the first lower punch when the dust core according to the reference example was formed.

For comparison, a dust core having no concave portion was formed by using a mold including a first lower punch having no convex portion but having a flat annular end surface, and the distribution of stress acting on the first lower punch was analyzed by CAE, as in the same way for Embodiment 1. Regarding the dust core according to this reference example, the maximum stresses occurring at the respective inner corners of the first lower punch at the time of compacting were calculated from the result of analysis by CAE. The distributions of stress near the corners A to C of the first lower punch 54 in the case of the dust core according to the reference example are illustrated in FIGS. 12 to 14, respectively, and the maximum stresses at the respective corners A to C are summarized in Table 1.

TABLE 1

| | Maximum Stress (MPa) | | |
| --- | --- | --- | --- |
| | Corner A | Corner B | Corner C |
| Embodiment 1 | 1812 | 1813 | 837.2 |
| Reference Example | 2333 | 2145 | 1468 |

According to the results of the stress analysis by CAE, the maximum stresses at the corners A to C of the first lower punch 54 in the case of the dust core 10 according to Embodiment 1 were 2000 MPa or smaller, showing a significant reduction in the maximum stress at each of the inner corners of the first lower punch 54 from that in the case of the dust core according to the reference example. Hence, in the case of the dust core 10 according to Embodiment 1, the stress occurring at the inner corners of the first lower punch 54 can be reduced, and the first lower punch 54 is therefore less likely to be damaged. In contrast, in the case of the dust core according to the reference example, the maximum stresses at the corners A and B of the first lower punch were over 2000 MPa, which makes the first lower punch 54 easily deformable and damageable.

Furthermore, it can be seen that the maximum stress at the corner C positioned on the inner side in the circumferential direction of the first lower punch 54 is relatively small among those at the corners A to C of the first lower punch. The reason for this is considered as follows. Since the first lower punch has two through holes arranged in symmetry, the lateral pressures acting thereon cancel each other out, making the stress due to the lateral pressure less likely to occur.

<Advantageous Effects of Dust Core>

The dust core 10 according to Embodiment 1 has the concave portions 30 provided in the toothed surface 15 of the yoke portion 11. Therefore, the deformation of the first lower punch 54 under the lateral pressure acting thereto at the time of compacting can be suppressed by the convex portions 60 provided on the annular end surface 54o of the first lower punch 54. Hence, even if the compacting pressure is increased for increasing the density of the dust core 10, the stress occurring at the inner corners of the first lower punch 54 can be reduced. Accordingly, the occurrence of damage to the first lower punch 54 can be suppressed. Therefore, the dust core 10 can have a high density and can be manufactured with high productivity.

Modifications

Embodiment 1 has been described by taking an exemplary case where the concave portions 30 provided in the dust core 10 each have a semicircular sectional shape with an arc-shaped curved surface (see FIG. 3). The present invention is not limited to such a case, and the concave portions 30 may each have an inclined surface inclining toward a corresponding one of the tooth portions 12. Now, concave portions of dust cores according to different modifications will be described.

A specific example of the concave portion having an inclined surface will now be described with reference to FIG. 15. A concave portion 31 illustrated in the upper part of FIG. 15 has a sectional shape defined by an inclined surface 41 inclining toward the tooth portion 12, and an arc-shaped curved surface 42 extending from the inclined surface 41 and being continuous with the peripheral surface of the tooth portion 12. In this example, the curved surface 42 has a curvature radius R of 1 mm, and the concave portion 31 has a depth D of 1 mm and a width Wd of 3 mm. On the other hand, a concave portion 32 illustrated in the lower part of FIG. 15 has a sectional shape defined by the inclined surface 41 inclining toward the tooth portion 12, and a perpendicular surface 43 extended from the peripheral surface of the tooth portion 12, with an R at a corner 44 where the inclined surface 41 and the perpendicular surface 43 meet. In this example, the corner 44 has a curvature radius R of 0.5 mm, and the concave portion 32 has a depth D of 1 mm and a width Wd of 3 mm. The concave portions 31 and 32 each have a sectional shape that is asymmetrical with respect to a perpendicular line passing through the apex of the concave portion, with the inclined surface 41 being longer.

Figure 15:
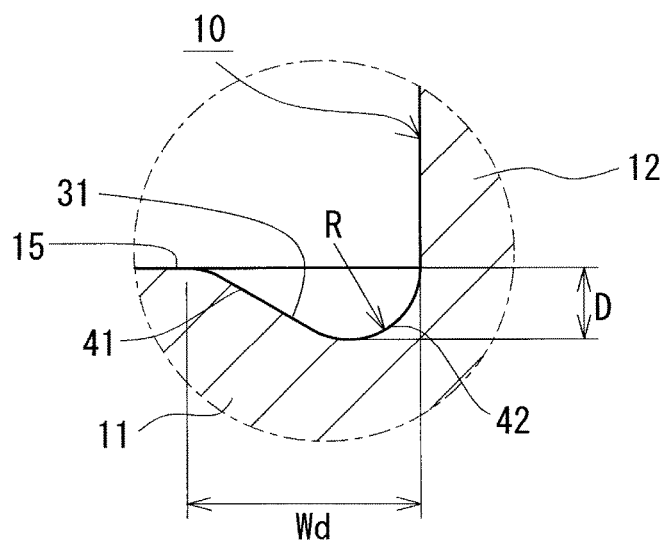
FIG. 15 includes enlarged sectional views of parts including concave portions of dust cores according to different modifications.
Figure 15:
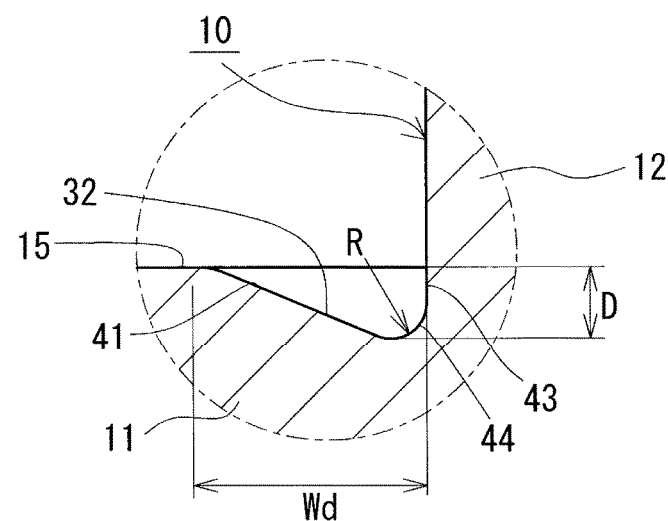
Figure 16:
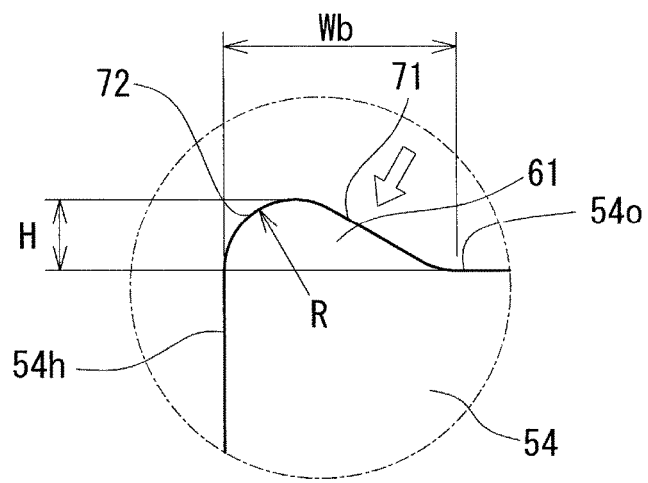
FIG. 16 includes enlarged sectional views of parts including convex portions of first lower punches included in molds for forming the dust cores according to the respective modifications.
Figure 16:
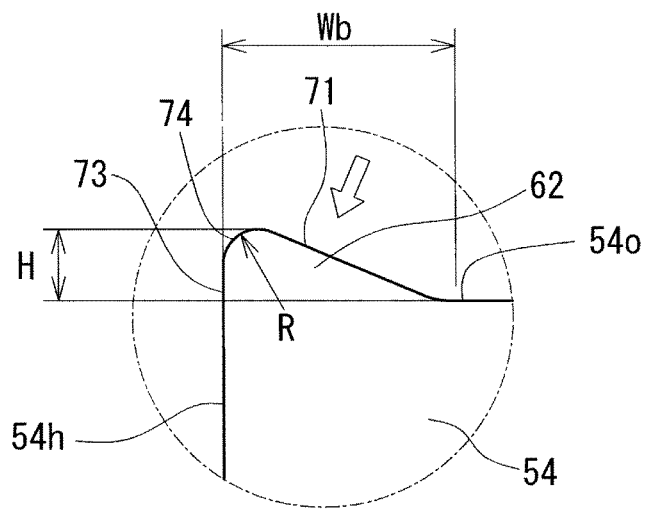
Figure 17:
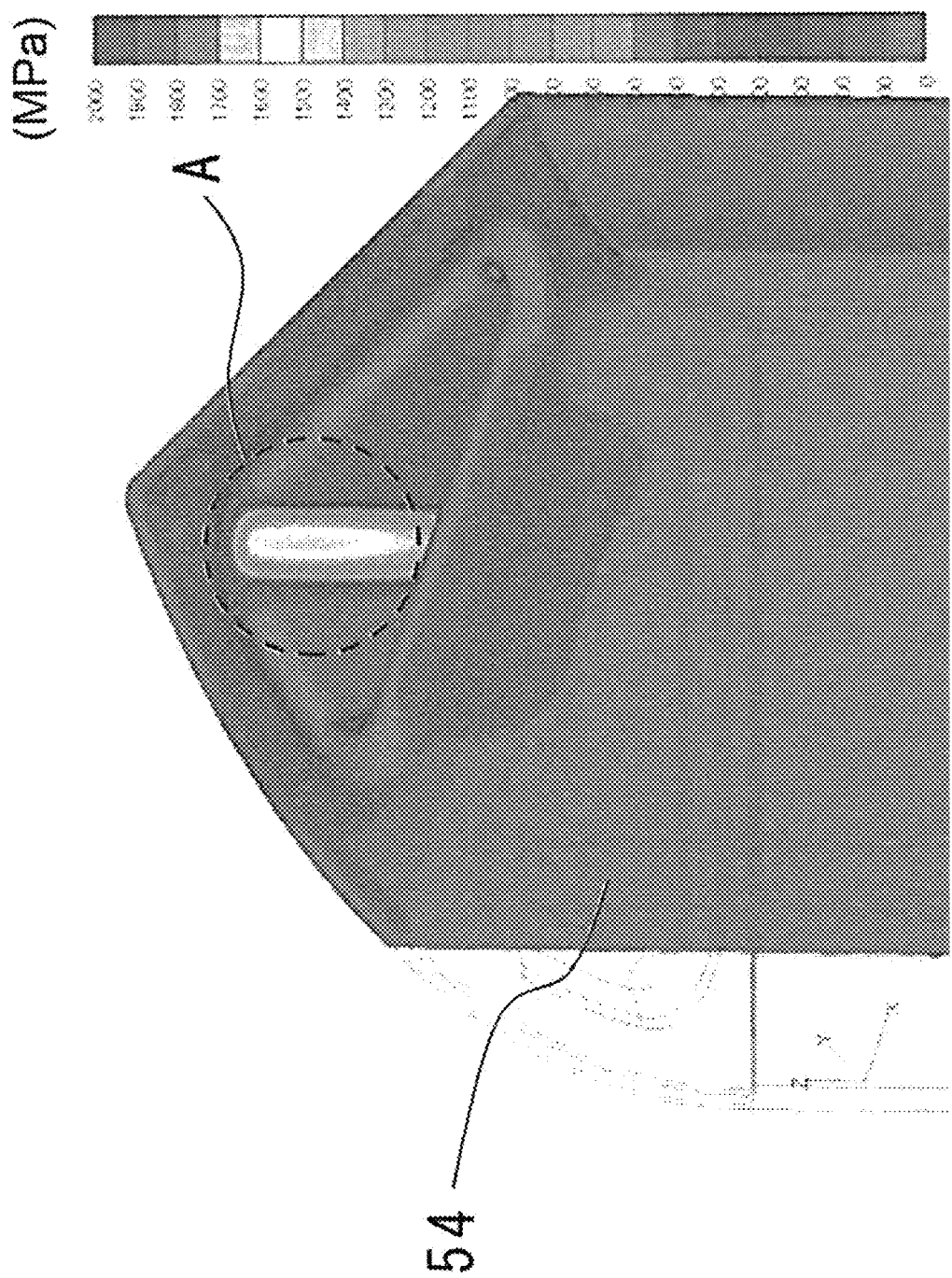
FIG. 17 is a diagram illustrating a distribution of stress that occurred in a first lower punch when a dust core according to Modification 1 was formed.
Figure 18:
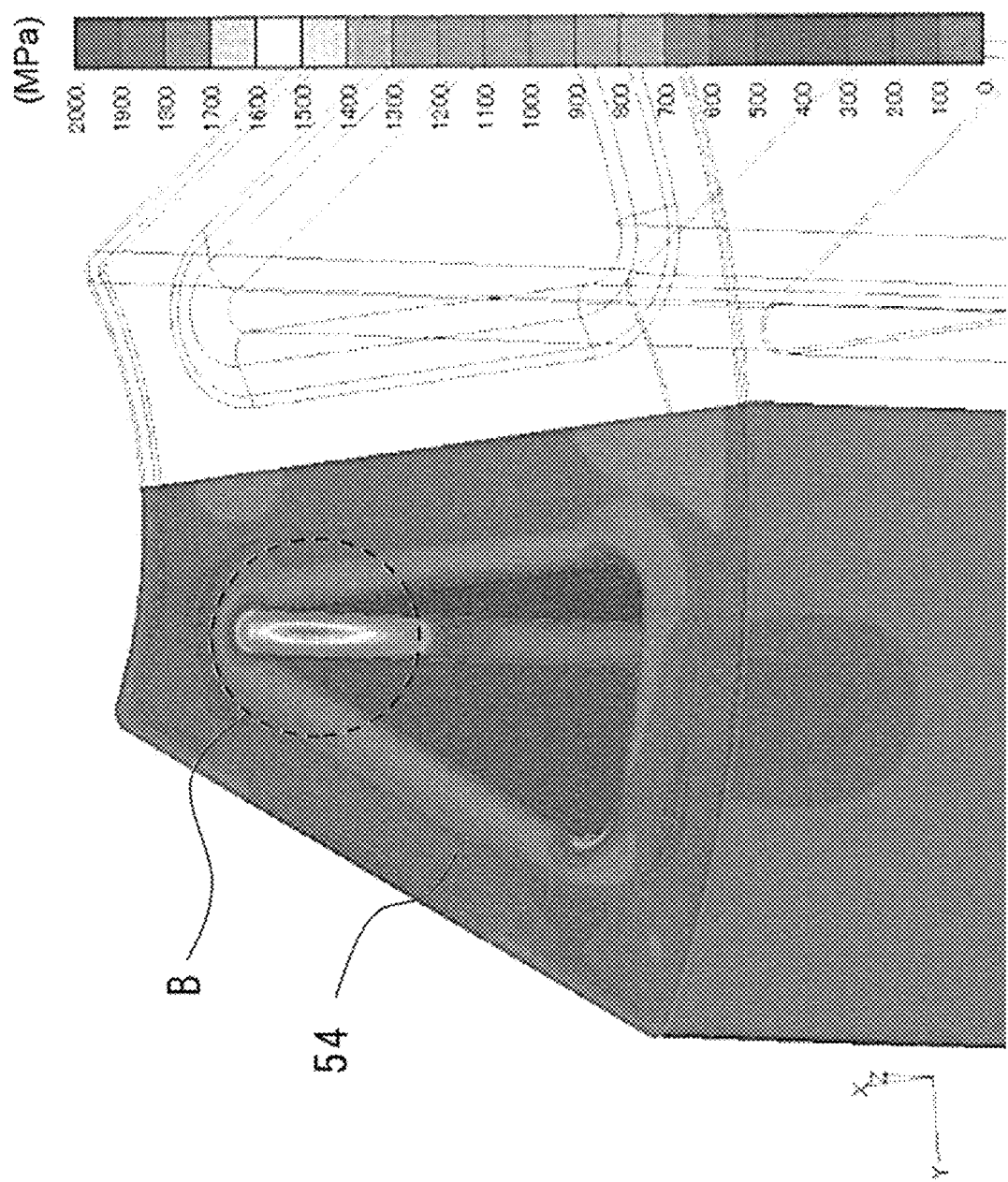
FIG. 18 is another diagram illustrating a distribution of stress that occurred in the first lower punch when the dust core according to Modification 1 was formed.
Figure 19:
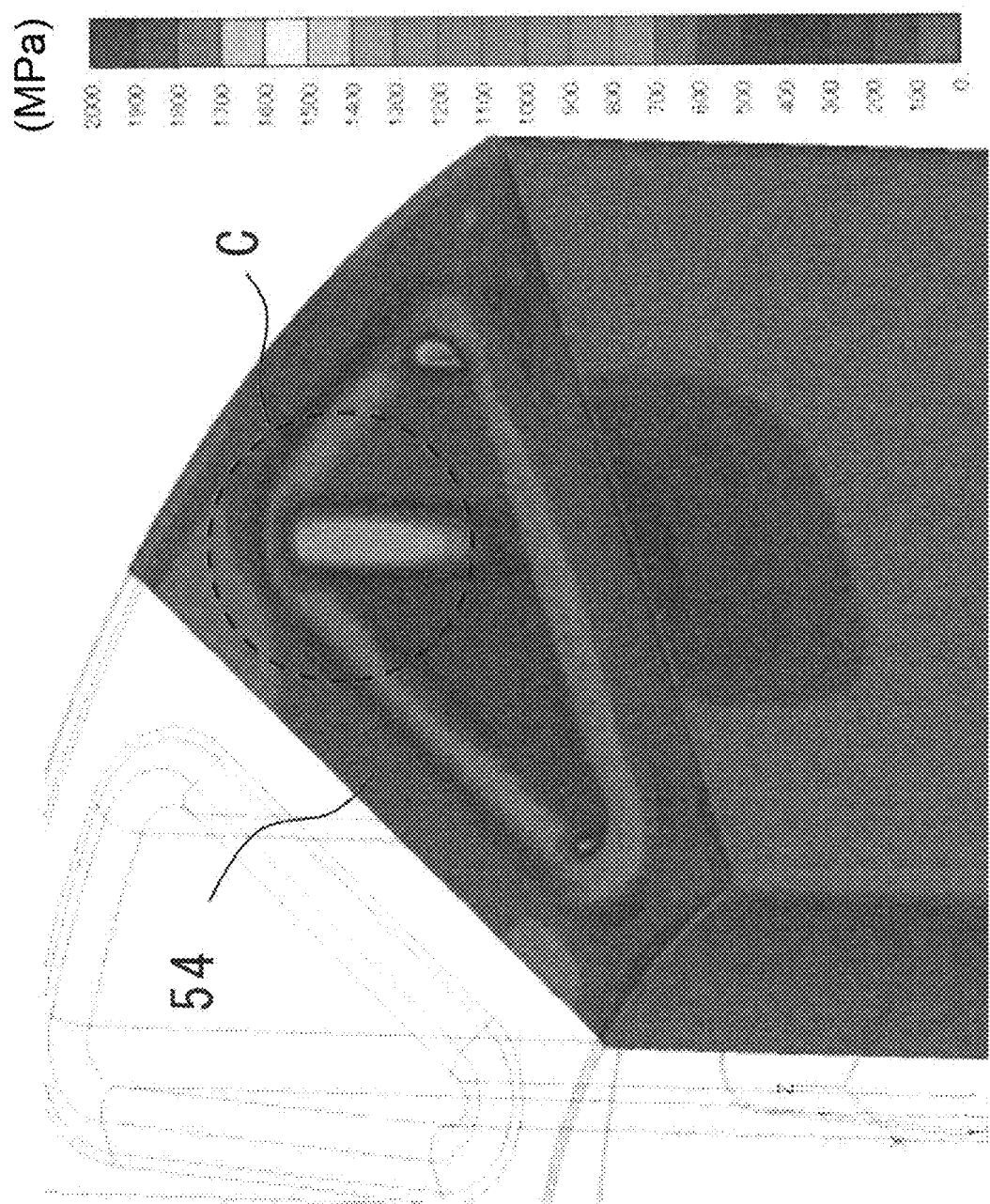
FIG. 19 is yet another diagram illustrating a distribution of stress that occurred in the first lower punch when the dust core according to Modification 1 was formed.
Figure 20:
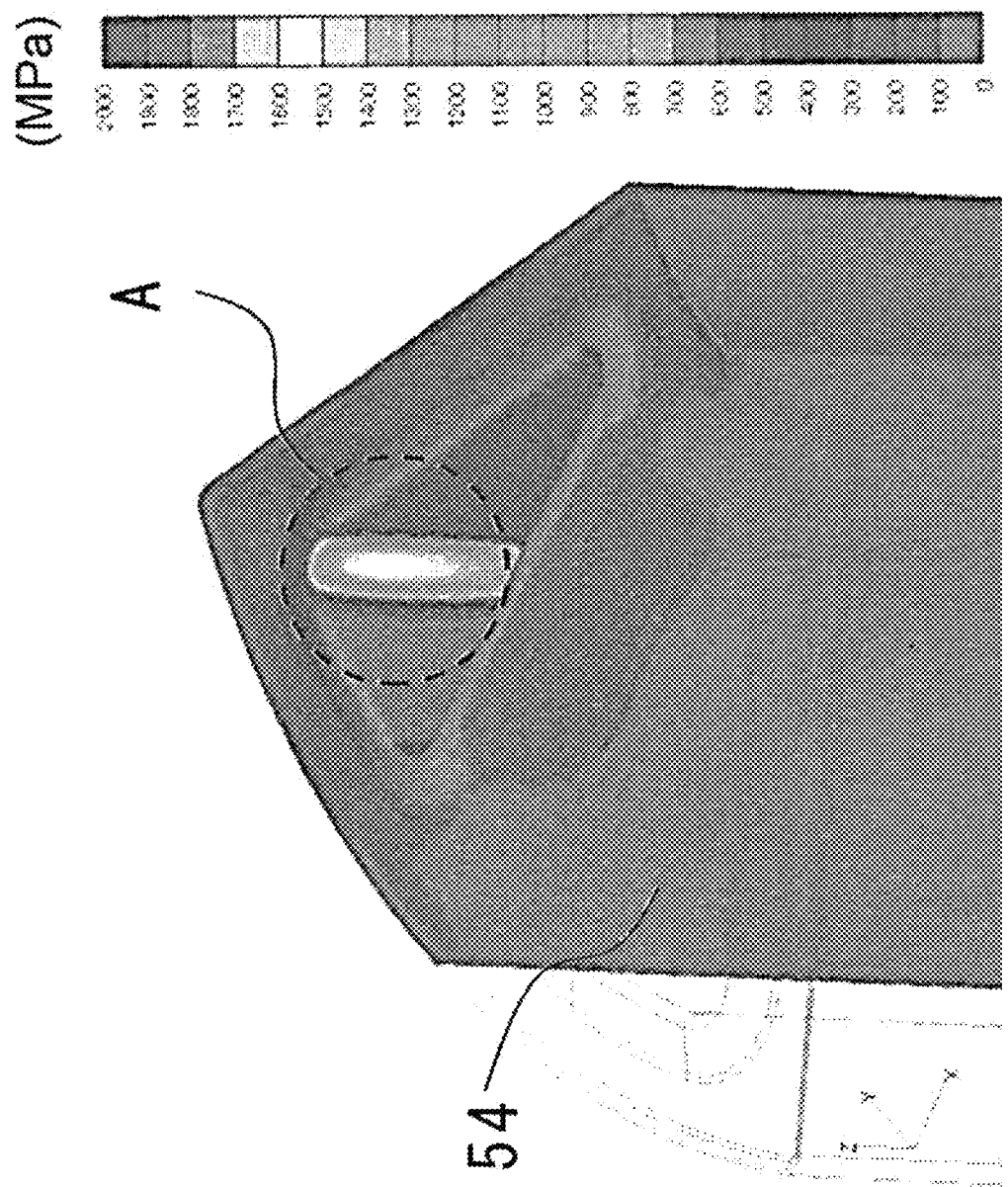
FIG. 20 is a diagram illustrating a distribution of stress that occurred in a first lower punch when a dust core according to Modification 2 was formed.
Figure 21:
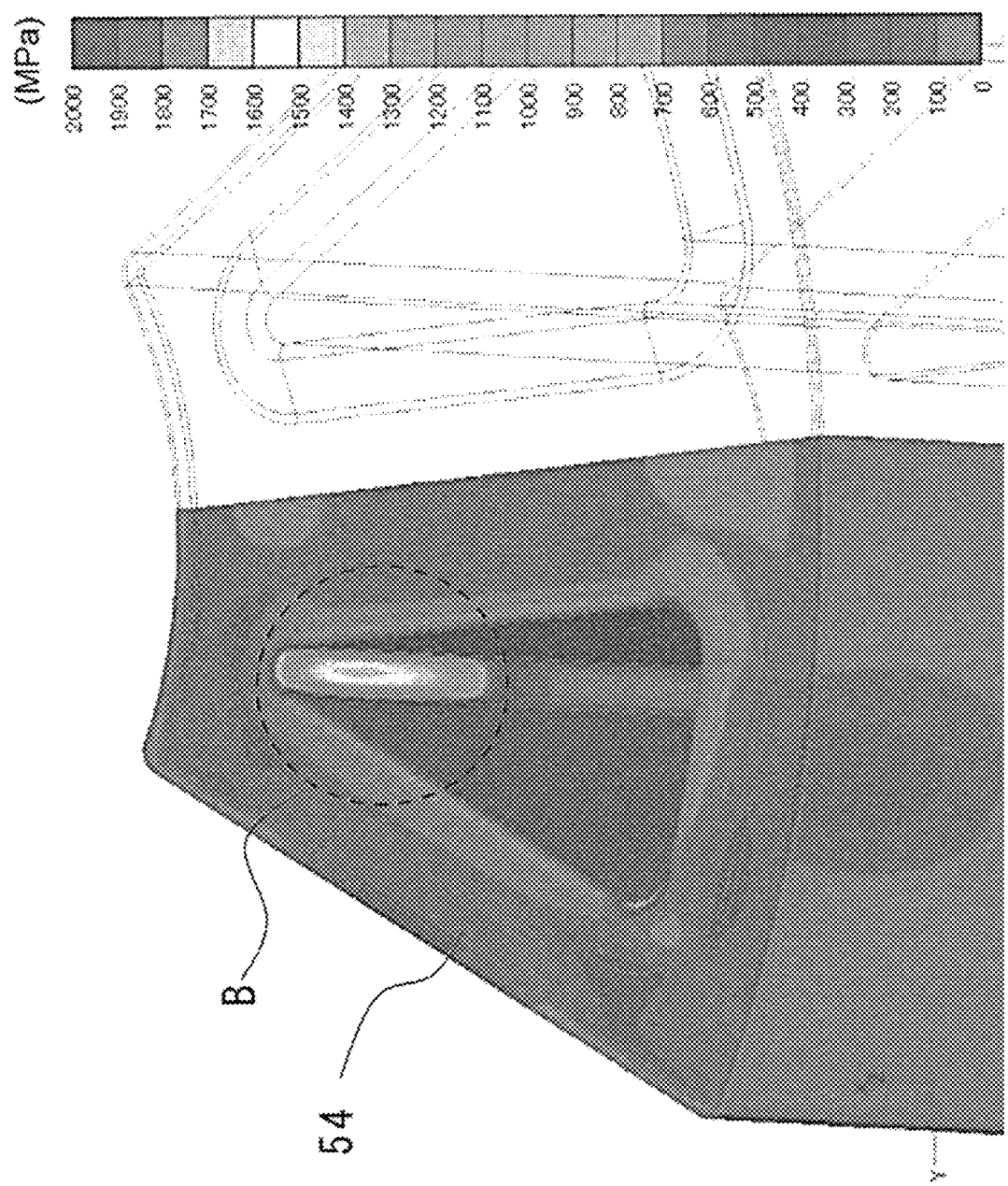
FIG. 21 is another diagram illustrating a distribution of stress that occurred in the first lower punch when the dust core according to Modification 2 was formed.
Figure 22:
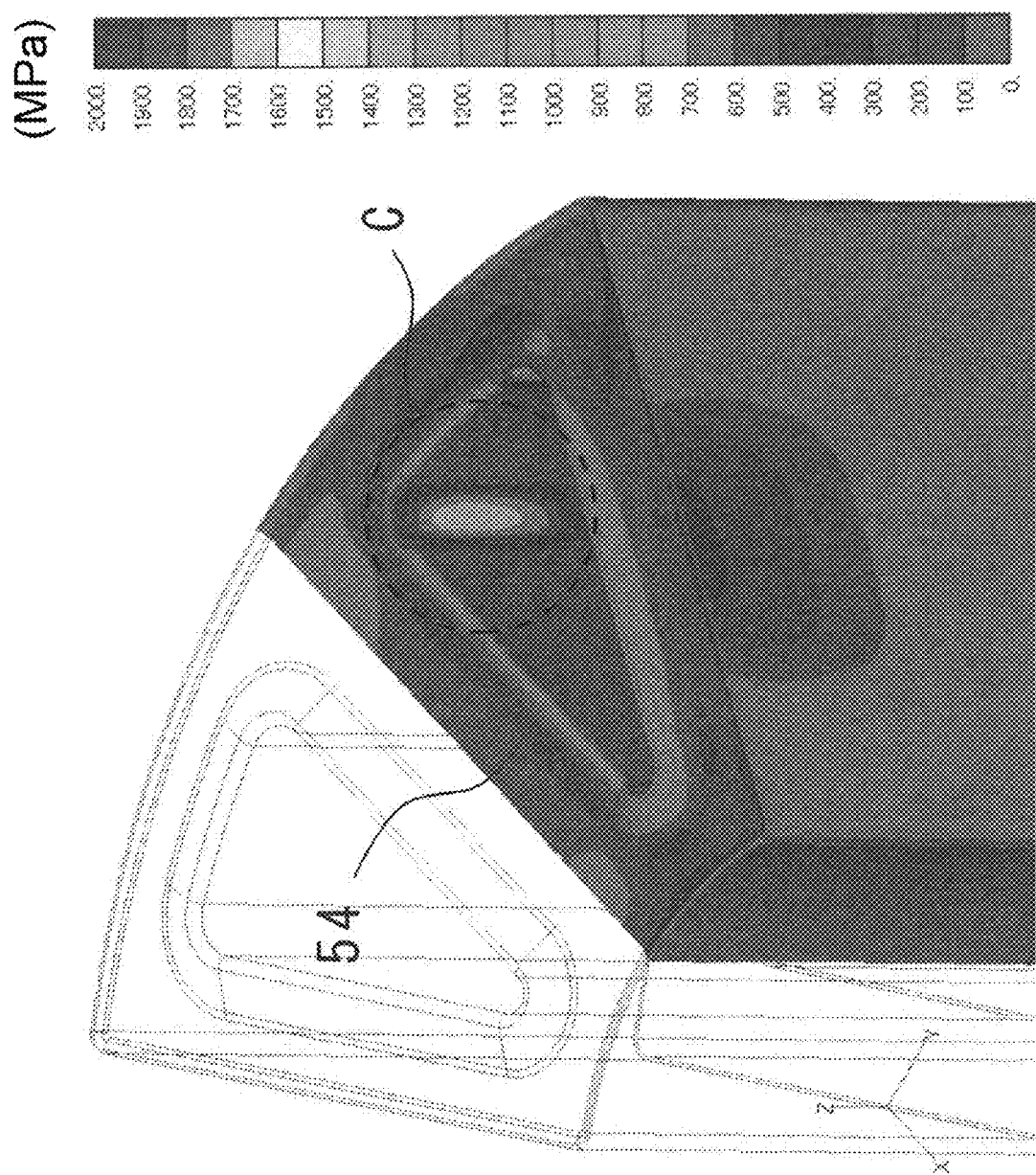
FIG. 22 is yet another diagram illustrating a distribution of stress that occurred in the first lower punch when the dust core according to Modification 2 was formed.

FIG. 16 illustrates convex portions 61 and 62 of first lower punches 54 for shaping the respective concave portions 31 and 32 illustrated in FIG. 15. The convex portion 61 illustrated in the upper part of FIG. 16 has a sectional shape conforming to the concave portion 31 and defined by an inclined surface 71 inclining toward the through hole 54h, and an arc-shaped curved surface 72 extending from the inclined surface 71 and being continuous with the inner peripheral surface of the through hole 54h. In this example, the curved surface 72 has a curvature radius R of 1 mm, and the convex portion 61 has a height H of 1 mm and a width Wb of 3 mm. On the other hand, the convex portion 62 illustrated in the lower part of FIG. 16 has a sectional shape conforming to the concave portion 32 and defined by the inclined surface 71 inclining toward the through hole 54h, and a perpendicular surface 73 extended from the inner peripheral surface of the through hole 54h, with an R at a corner 74 where the inclined surface 71 and the perpendicular surface 73 meet. In this example, the corner 74 has a curvature radius R of 0.5 mm, and the convex portion 62 has a height H of 1 mm and a width Wb of 3 mm. The convex portions 61 and 62 each have a sectional shape that is asymmetrical with respect to a perpendicular line passing through the apex of the concave portion, with the inclined surface 71 being longer.

Advantageous Effects

In the case where the convex portion 61 or 62 provided in the first lower punch 54 has the inclined surface 71 that conforms to the inclined surface 41 of the concave portion 31 or 32 provided in the dust core 10, when raw material powder is compacted, a pressure acts on the inclined surface 71. The pressure received by the inclined surface 71 acts toward the through hole 54h as represented by a white arrow in FIG. 16. That is, the pressure acts in such a direction that the lateral pressure acting on the inner peripheral surface of the through hole 54h at the time of compacting is cancelled out. Since at least part of the lateral pressure acting on the first lower punch 54 can be cancelled out by the pressure received by the inclined surface 71 of the convex portion 61 or 62 at the time of compacting, the deformation of the first lower punch 54 under the lateral pressure can be suppressed further.

<Analysis of Stress Occurring in First Lower Punch>

A dust core 10 including the concave portion 31 illustrated in the upper part of FIG. 15 is defined as Modification 1, and a dust core 10 including the concave portion 32 illustrated in the lower part of FIG. 15 is defined as Modification 2. Using the first lower punches 54 described with reference to FIG. 16, the distributions of stresses acting on the respective first lower punches 54 in forming the dust cores 10 according to Modifications 1 and 2 were analyzed by CAE, as in the same way employed in Embodiment 1. For each of the dust cores according to Modifications 1 and 2, the maximum stresses occurring at the respective inner corners of the first lower punch 54 at the time of compacting were calculated from the result of the analysis by CAE. The distributions of stress (unit: MPa) near the corners A to C of the first lower punch 54 for the dust cores according to Modifications 1 and 2 are illustrated in FIGS. 17 to 19 and FIGS. 20 to 22, respectively, and the maximum stresses at the respective corners A to C are summarized in Table 2.

TABLE 2

| | Maximum Stress (MPa) | | |
|---|---|---|---|
| | Corner A | Corner B | Corner C |
| Embodiment 1 | 1812 | 1813 | 837.2 |
| Modification 1 | 1687 | 1747 | 825.3 |
| Modification 2 | 1593 | 1663 | 775.8 |

According to the results of the stress analysis by CAE, it can be seen that the maximum stresses at the corners of the first lower punch 54 of each of the dust cores 10 according to Modifications 1 and 2 are much lower than those of the dust core 10 according to Embodiment 1. Hence, in the dust core 10 according to each of Modifications 1 and 2, the stresses occurring at the inner corners of the first lower punch 54 can be reduced further, and the first lower punch 54 is therefore much less likely to be damaged. The reason for this is considered as follows. In the dust core 10 according to each of Modifications 1 and 2, the concave portion 31 or 32 has the inclined surface 41, and the inclined surface 71 that shapes the inclined surface 41 is included in the convex portion 61 or 62 of the first lower punch 54. Since the convex portion 61 or 62 of the first lower punch 54 has the inclined surface 71, at least part of the lateral pressure acting on the first lower punch 54 can be cancelled out by the pressure received by the inclined surface 71 at the time of compacting. Furthermore, the result of comparison between Modifications 1 and 2 suggests that the effect of reducing the stress occurring at the inner corners of the first lower punch 54 is greater in Modification 2 employing the longer inclined surface 41 (inclined surface 71).

<Stator Core>

Figure 23:
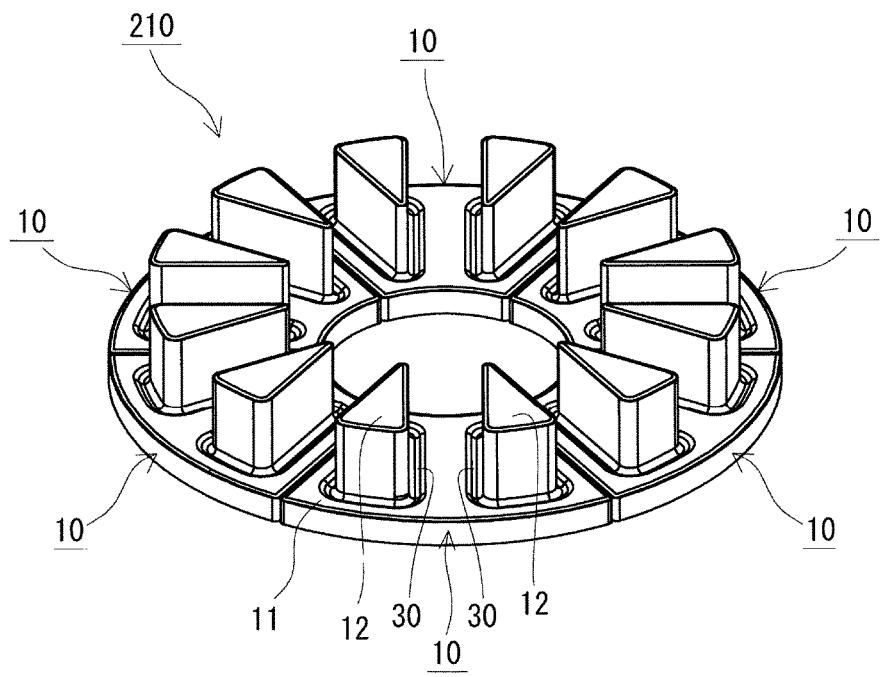
FIG. 23 is a perspective view of an exemplary stator core according to an embodiment.

Referring to FIG. 23, a stator core 210 according to an embodiment will now be described. The stator core 210 is a stator core included in an axial-gap rotary electric machine and includes the dust core 10, which is one of a plurality of dust cores 10 that are combined together annularly. In the present embodiment, a set of six dust cores 10 are arranged annularly, and end surfaces, on respective sides in the circumferential direction, of adjacent ones of the yoke portions 11 are joined to each other with adhesive or the like, whereby the stator core 210 is obtained.

<Stator>

Figure 24:
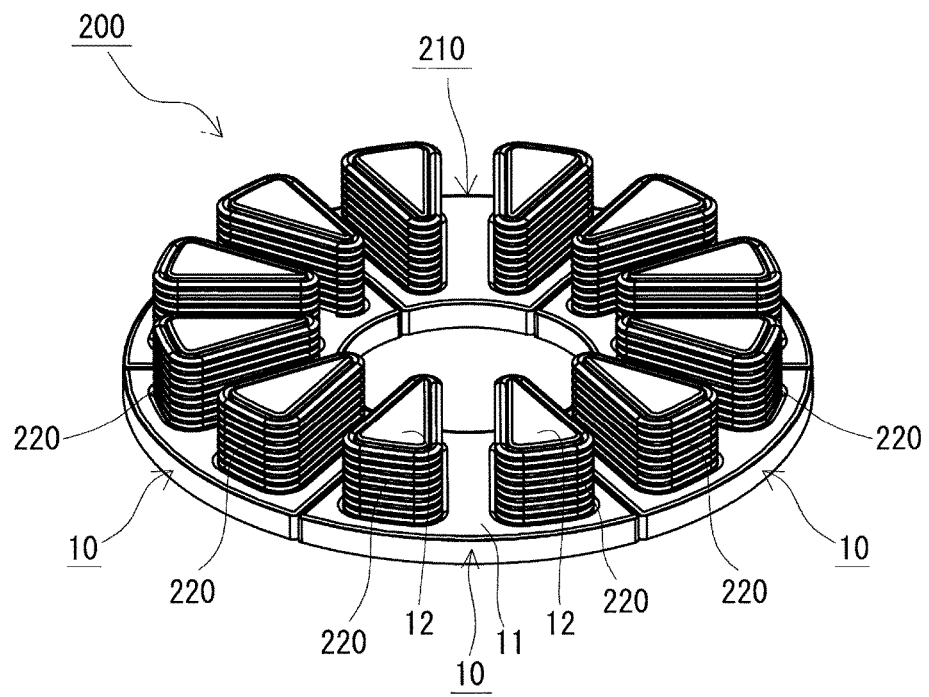
FIG. 24 is a perspective view of an exemplary stator according to an embodiment.

Referring to FIG. 24, a stator 200 according to an embodiment will now be described. The stator 200 is a stator included in an axial-gap rotary electric machine and includes the stator core 210, and coils 220 provided on the respective tooth portions 12 of the dust cores 10 forming the stator core 210. The coils 220 are each provided by concentrated winding.

<Axial-Gap Motor>

A specific example of the axial-gap rotary electric machine will now be described. An axial-gap motor (hereinafter also simply referred to as "motor") according to an embodiment will now be described with reference to FIGS. 25 to 27.

Figure 25:
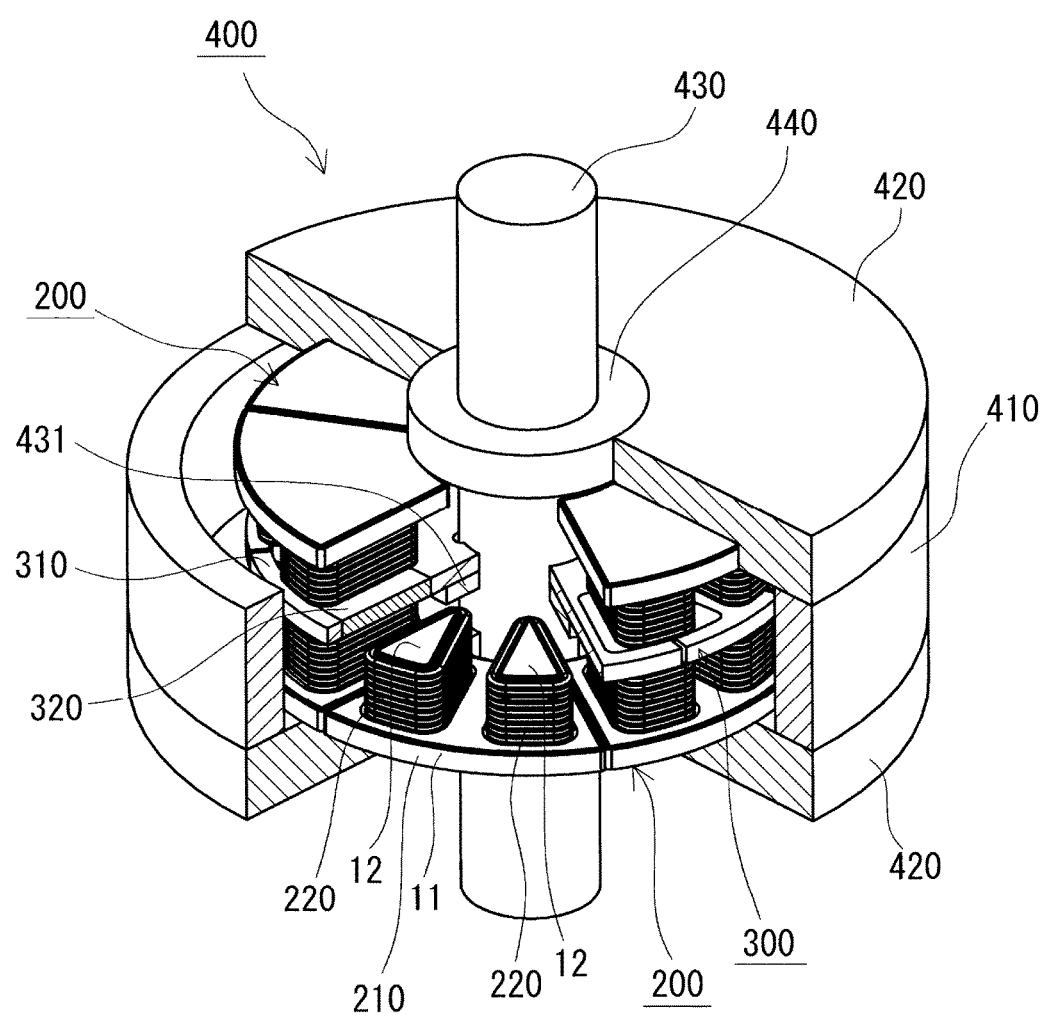
FIG. 25 is a partially cut perspective view of an exemplary axial-gap motor according to an embodiment.
Figure 26:
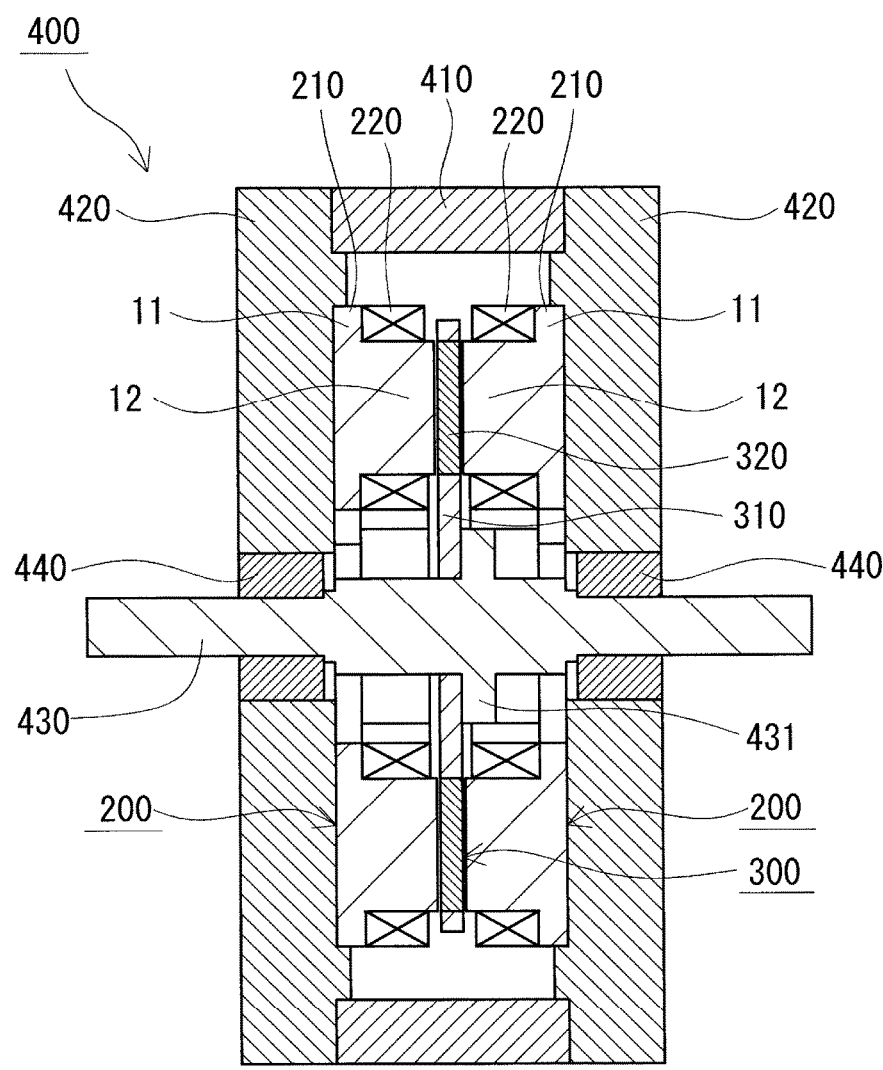
FIG. 26 is a sectional view of the axial-gap motor illustrated in FIG. 25.

As illustrated in FIGS. 25 and 26, an axial-gap motor 400 includes a rotor 300 and stators 200 that face each other in the axial direction. In the present embodiment, two stators 200 are provided in such a manner as to face the respective sides of the rotor 300. The rotor 300 and the stators 200 are housed in a cylindrical housing 410. The housing 410 is provided with disc-like plates 420 on two respective sides thereof. The two plates 420 each have a through hole in the center thereof. A shaft 430 is rotatably supported in the through holes with bearings 440 interposed therebetween. The stators 200 are each oriented such that the side thereof having the tooth portions 12 faces the rotor 300. The yoke portions 11 of each of the stator cores 210 are fixed to a corresponding one of the plates 420.

Figure 27:
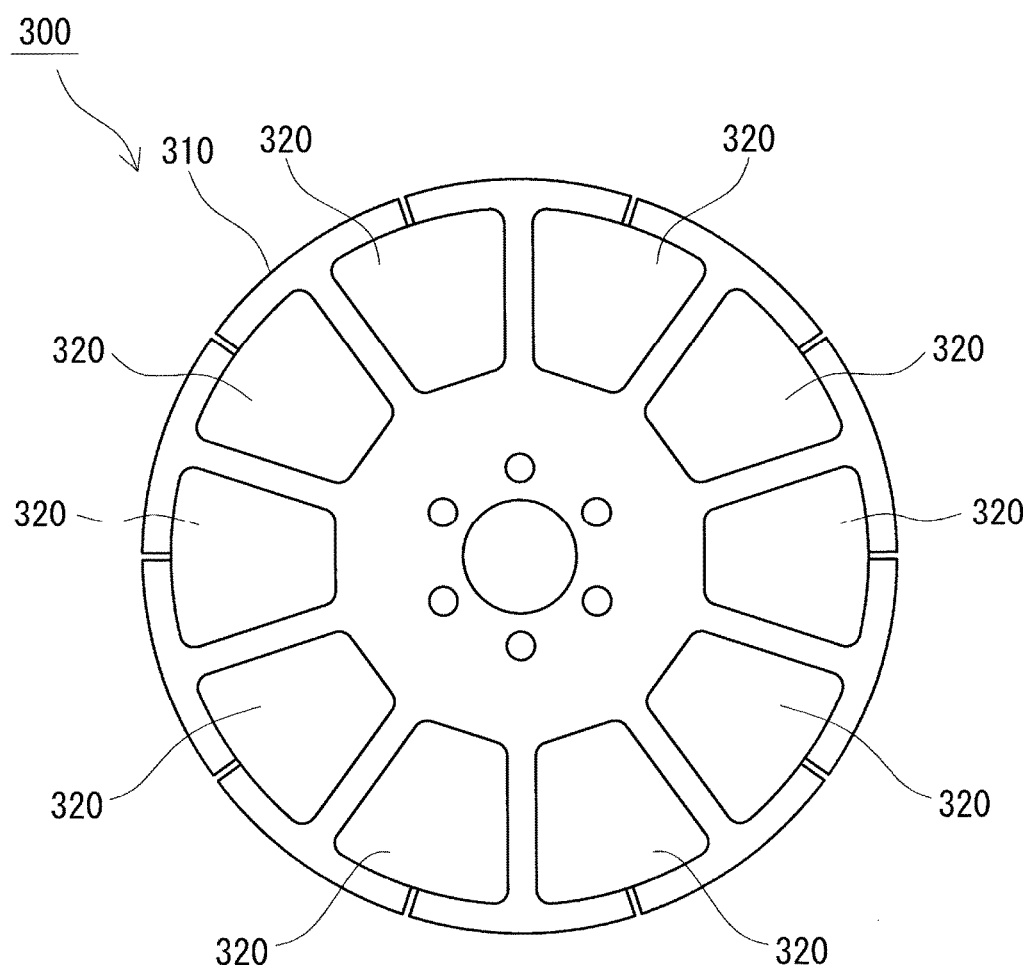
FIG. 27 is a front view of a rotor included in the axial-gap motor illustrated in FIG. 25.

The rotor 300 includes a plurality of magnets 320, and a supporting member 310 that supports the magnets 320. The magnets 320 each have a flat plate-like shape. As illustrated in FIG. 27, the magnets 320 are embedded along the outer periphery of the supporting member 310, which has an annular shape, and are arranged at intervals in the circumferential direction of the rotor 300. In the present embodiment, the rotor 300 includes ten magnets 320. The magnets 320 are each polarized in the axial direction of the rotor 300 and are oriented such that the direction of polarization is reversed between adjacent ones of the magnets 320. The inner circumferential side of the supporting member 310 is fixed to a flange portion 431 included in the shaft 430, whereby the rotor 300 is supported by the shaft 430.

Regarding the embodiments of the present invention that have been described above, an appendant clause will be disclosed below.

[Appendant 1]

A mold for forming a dust core including a sector-shaped plate-like yoke portion and a tooth portion projecting from the yoke portion, the mold comprising:

a die having a sector-shaped mold hole that shapes a peripheral surface of the yoke portion;

an upper punch to be fitted into the mold hole of the die and having an end surface that shapes a lower surface of the yoke portion;

a first lower punch to be fitted into the mold hole of the die, the first lower punch having a through hole that shapes a peripheral surface of the tooth portion, and an annular end surface that shapes a toothed surface of the yoke portion from which the tooth portion projects; and a second lower punch to be inserted into the through hole of the first lower punch and having an end surface that shapes an upper end surface of the tooth, wherein the annular end surface of the first lower punch has a convex portion provided between a peripheral edge of the through hole and a peripheral edge of the first lower punch.

[Appendant 2]

The mold according to Appendant 1, wherein the convex portion extends along each of peripheral edges of the first lower punch that are on two respective sides in a circumferential direction of the first lower punch.

[Appendant 3]

The mold according to Appendant 1 or 2, wherein the convex portion extends along an entire peripheral edge of the through hole.

[Appendant 4]

The mold according to any of Appendants 1 to 3, wherein the convex portion has an inclined surface inclining toward the through hole.

[Appendant 5]

A method of manufacturing a dust core including a sector-shaped plate-like yoke portion and a tooth portion projecting from the yoke portion, the method comprising:

using the mold according to any of Appendants 1 to 4, a feeding step in which raw material powder containing soft magnetic powder as a chief component is fed into a cavity of the mold, the cavity being defined by the mold hole of the die, the first lower punch, and the second lower punch;

a shaping step in which the fed raw material powder is compacted by the upper punch, the first lower punch, and the second lower punch and is shaped into the dust core; and a removing step in which the dust core is removed from the mold.

[Appendant 6]

The method of manufacturing a dust core according to Appendant 5, wherein, in the shaping step, compacting pressure applied at a time of compacting is 686 MPa or higher.

REFERENCE SIGNS LIST 10, 100 dust core
11, 110 yoke portion
12, 120 tooth portion
15 toothed surface
21, 22 side edge
23 outer circumferential edge
30, 31, 32 concave portion
41 inclined surface
42 curved surface
43 perpendicular surface
44 corner
50, 500 mold
51, 510 die
51$h$, 510$h$ mold hole
52, 520 upper punch
52$f$, 520$f$ end surface
53, 530 lower punch
54, 540 first lower punch
54$h$, 540$h$ through hole
54$a$, 54$b$ side edge
54$c$ outer circumferential edge
54$o$, 540$o$ annular end surface
55, 550 second lower punch
55$f$, 550$f$ end surface
60, 61, 62 convex portion
71 inclined surface
72 curved surface
73 perpendicular surface
74 corner
200 stator
210 stator core
220 coil
300 rotor
310 supporting member
320 magnet
400 motor
410 housing
420 plate
430 shaft
431 flange portion
440 bearing

The invention claimed is:

1. A dust core included in an axial-gap rotary electric machine, the dust core comprising:

a sector-shaped plate-like yoke portion; and a tooth portion that extends into the yoke portion and projecting from the yoke portion, wherein, denoting one of surfaces of the yoke portion from which the tooth portion projects as a toothed surface, the toothed surface has a concave portion provided between a peripheral edge of the tooth portion and a peripheral edge of the yoke portion, and the toothed surface, a surface of the concave portion, and a surface of the yoke portion being a uniform continuous surface, and wherein the uniform continuous surface of the concave portion extends along at least an entire side of the tooth portion, and the concave portion extends along each of peripheral edges of the yoke portion that are on two respective sides in a circumferential direction of the yoke portion.

2. The dust core according to claim 1, wherein the concave portion extends along an entire peripheral edge of the tooth portion.

3. The dust core according to any of claim 1, wherein the concave portion has an inclined surface inclining toward the tooth portion.

4. The dust core according to any of claim 1, wherein the dust core has a relative density of 90% or higher.

5. The dust core according to claim 1, wherein the tooth portion projects perpendicularly from the concave portion of the toothed surface.

6. The dust core according to claim 5, wherein an upper end surface of the tooth portion having one of a substantially triangular shape or a substantially trapezoidal shape.

7. A stator core included in an axial-gap rotary electric machine, the stator core comprising:

a first dust core comprising a sector-shaped plate-like yoke portion, and a tooth portion that extends into the yoke portion and projecting from the yoke portion, wherein, denoting one of surfaces of the yoke portion from which the tooth portion projects as a toothed surface, the toothed surface has a concave portion provided between a peripheral edge of the tooth portion and a peripheral edge of the yoke portion, wherein the toothed surface, a surface of the concave portion, and a surface of the yoke portion being a uniform continuous surface, wherein the uniform continuous surface of the concave portion extends along at least an entire side of the tooth portion, and the concave portion extends along each of peripheral edges of the yoke portion that are on two respective sides in a circumferential direction of the yoke portion; and at least one second dust core, wherein the first dust core is combined annularly together with the at least the second dust core.

8. The stator core according to claim 7, wherein:

the yoke portion of the first dust core having end surfaces on respective sides, one of the end surfaces being joined to an end surface of the at least one second dust core, and a position of the second dust core being adjacent to the first dust core in a circumferential direction.

9. The stator core according to claim 8, wherein:

the end surfaces being joined with an adhesive.

10. The stator core according to claim 7, wherein the concave portion of the toothed surface of the first dust core extends along an entire peripheral edge of the tooth portion.

11. The stator core according to claim 7, wherein the concave portion of the toothed surface of the first dust core has an inclined surface that inclines toward the tooth portion.

12. The stator core according to claim 7, wherein the first dust core has a relative density of 90% or higher.

13. A stator included in an axial-gap rotary electric machine, the stator comprising:

a stator core that includes a first dust core comprising a sector-shaped plate-like yoke portion, and a tooth portion that extends into the yoke portion and projecting from the yoke portion, wherein, denoting one of surfaces of the yoke portion from which the tooth portion projects as a toothed surface, the toothed surface has a concave portion provided between a peripheral edge of the tooth portion and a peripheral edge of the yoke portion, wherein the toothed surface, a surface of the concave portion, and a surface of the yoke portion being a uniform continuous surface, wherein the uniform continuous surface of the concave portion extends along at least an entire side of the tooth portion, and the concave portion extends along each of peripheral edges of the yoke portion that are on two respective sides in a circumferential direction of the yoke portion; and at least a second dust core, wherein the first dust core is combined annularly together with the at least one second dust core; and coils provided on tooth portions of the first dust core and the at least one second dust core that collectively form the stator core.

14. The stator according to claim 13, wherein:

the yoke portion of the first dust core having end surfaces on respective sides, one of the end surfaces being joined to an end surface of the at least one second dust core, and a position of the second dust core being adjacent to the first dust core in a circumferential direction.

15. The stator according to claim 13, wherein the concave portion of the toothed surface of the first dust core extends along an entire peripheral edge of the tooth portion.

16. The stator according to claim 13, wherein the concave portion of the toothed surface of the first dust core has an inclined surface that inclines toward the tooth portion.

17. The stator according to claim 13, wherein the first dust core has a relative density of 90% or higher.

* * * * *